(12) United States Patent
Chiba et al.

(10) Patent No.: US 11,784,599 B2
(45) Date of Patent: Oct. 10, 2023

(54) NOISE REDUCTION IN SWITCHED RELUCTANCE MOTOR WITH SELECTIVE RADIAL FORCE HARMONICS REDUCTION

(71) Applicants: Tokyo Institute of Technology, Tokyo (JP); Turntide Technologies Inc., Sunnyvale, CA (US)

(72) Inventors: Akira Chiba, Tokyo (JP); Candra Adi Wiguna, Kanagawa (JP); Jihad Furqani, Bogor (ID); Piyush Desai, Des Plaines, IL (US)

(73) Assignees: Tokyo Institute of Technology, Tokyo (JP); Turntide Technologies Inc., Sunnyvale, CA (US)

( * ) Notice: Subject to any disclaimer, the term of this patent is extended or adjusted under 35 U.S.C. 154(b) by 0 days.

(21) Appl. No.: 17/665,548

(22) Filed: Feb. 6, 2022

(65) Prior Publication Data

US 2023/0253904 A1 Aug. 10, 2023

(51) Int. Cl.
*H02P 25/098* (2016.01)

(52) U.S. Cl.
CPC .................................. *H02P 25/098* (2016.02)

(58) Field of Classification Search
CPC ...................................................... H02P 25/098
USPC ........................................................ 318/701
See application file for complete search history.

(56) References Cited

U.S. PATENT DOCUMENTS

| 6,922,036 B1 | 7/2005 | Ehsani et al. |
| 2011/0284300 A1 | 11/2011 | Cheng et al. |
| 2018/0351496 A1 | 12/2018 | Vaks et al. |
| 2019/0020297 A1 | 1/2019 | Pop et al. |
| 2022/0173676 A1 * | 6/2022 | Purfuerst ............... B60J 7/0573 |

FOREIGN PATENT DOCUMENTS

WO  2021207529 A1  10/2021

OTHER PUBLICATIONS

Rodriquez, Kari, International Search Report from the International Searching Authority for priority application PCT/US/42234, pp. 1-22, published Dec. 8, 2022.

* cited by examiner

*Primary Examiner* — Kawing Chan
(74) *Attorney, Agent, or Firm* — Temmerman Law; Mathew J. Temmerman

(57) ABSTRACT

An SR drive with an acoustic noise reduction system for reducing vibration and acoustic noise in a switched reluctance motor (SRM). The vibration and acoustic noise at specific harmonics of current excitation in SRM are in a proportional relationship with the radial force harmonics acting at SRM stator teeth. The acoustic noise reduction system includes a processor on which is installed an acoustic noise reduction application designed to derive an optimum current waveform for generating an average torque satisfying an optimum torque condition and creating radial force with minimum amplitude at the desired order of harmonics of current excitation. A reduction in the amplitude of the specific radial force harmonics utilizing the optimum current waveform minimizes the vibration and acoustic noise in the SRM. The acoustic noise reduction system applies turn-on and turn-off angles at the optimum current waveform to improve the system efficiency.

15 Claims, 22 Drawing Sheets

NOISE REDUCTION IN SWITCHED RELUCTANCE MOTOR WITH SELECTIVE RADIAL FORCE HARMONICS REDUCTION

BACKGROUND OF THE DISCLOSURE

Technical Field of the Disclosure

The present invention relates generally to systems for reducing acoustic noise in switched reluctance motors, and more particularly, to an acoustic noise reduction system for reducing vibration and acoustic noise in a switched reluctance motor by selectively reducing specific radial force harmonics acting at stator teeth.

Description of the Related Art

The performance of an electric motor is an important issue in industrial applications. A good quality electric motor must have high efficiency, high reliability, and low cost. Electric machines such as induction motors (IMs), permanent magnet synchronous motors (PMSMs), and synchronous reluctance motors have been developed to meet these quality requirements. Currently, the usage of the permanent magnet in the electric motor is considered to reach the IE4 standard. This method of utilizing permanent magnets is mature, although it is expensive due to the costs of the required components.

Switched Reluctance Motors (SRMs) can be used as one of the alternatives for electric motors in industrial application. SRMs have advantages such as they do not use rare-earth materials, they have low manufacturing costs, high reliability, and have a possibility to be operated at high temperatures and high rotational speeds. However, SRMs have drawbacks of high acoustic noise and vibration and high torque ripple. Novel SRMs with a higher number of rotor poles have been investigated to reduce the torque ripple and enhance the system efficiency.

Several methods have been developed to overcome the vibration and acoustic noise in SRMs. In one such method, the vibration and acoustic noise are reduced by improving the motor structure or by optimizing the voltage and current excitation. In another method, a spacer made from diamagnetic material is inserted between the stator teeth to increases the stiffness of the stator structure. In this method, the acoustic noise can be reduced. Yet another improvement introduces a windowed rotor and stator structure to reduce the radial force amplitude. In this method, further reductions of peak noise are achieved. Still yet another method introduced skewing rotors and stator structures to reduce the radial force can further limit acoustic noise.

In other conventional systems, to achieve voltage and current optimization, an active vibration cancellation (AVC) method was implemented to reduce noise at natural frequencies in one conventional case with a maximum reduction of −16.3 dB. More research in AVC methods have been carried out by including mechanical impulse as the reference to determine the reference current. Only one frequency component can be eliminated, although there are several frequency components in general. A current shaping based on Two-Dimensional Fast Fourier Transformation (2D-FFT) of radial force density analysis was introduced to reduce the acoustic noise up to −19.6 dB. Another effective method of flattening radial force sum has been proposed and verified to reduce the acoustic noise in SRMs having a high pole number (HRSRMs). These conventional methods have been effective to reduce the vibration mode 0 in SRM with high pole number and results in an acoustic noise reduction of up to −22 dB, but further work and advancements are still needed.

FIG. 1 shows a graphical representation of an example of radial force density of a three-phase 6/10 pole SRM excited by a conventional square current. Here, the radial force density is acting at an air gap with respect to a mechanical angle a and time t. The radial force density $\sigma_r(\alpha, t)$ is calculated utilizing Maxwell Stress Tensor expressed as $$\sigma_r(\alpha, t) = \frac{1}{2\mu_0}(B_r^2 - B_t^2) \tag{1}$$

where $B_r$ is the radial magnetic flux density, $B_t$ is the tangential magnetic flux density, and $\mu_0$ is the permeability of free space. The radial force density is calculated utilizing the magnetic flux density along the central path of the air gap utilizing a 2D model of an SRM. In this example, the number of stator poles and rotor poles are 6 and 10 respectively. The short-pitch concentrated windings are assigned to the stator poles. This motor has the rated speed and the rated torque at 1800 rpm and 4.8 Nm respectively. The maximum efficiency of this type of 6/10 pole SRM is 92%.

As shown in FIG. 1, there are two peaks of radial force density at the same time periods from a pair of stator teeth in each phase. The value of peak radial force density is proportional to the number of stator teeth. The radial force density in each phase is generated by the excitation of the conventional square current which is a typical current in SRM.

FIG. 2 shows a graphical representation of an example of a 2D-FFT analysis of the radial force density illustrated in FIG. 1. In this analysis, the radial force density is calculated by the equation expressed as $$\sigma_r(a,t) = \Sigma_{v=-\infty}^{\infty}\Sigma_{u=-\infty}^{\infty}[\sigma_r(v,u)\cos(2\pi f_{mech}ut+v\alpha+\emptyset_{v,u})] \tag{2}$$

where u is the temporal order, $f_{mech}$ is the mechanical frequency, and $\emptyset_{v,u}$ is the phase angle. The spatial order v represents the excitation shape which resonates with the vibration mode of the stator structure. Here, the temporal order corresponds to the frequency of the current harmonics. The fundamental frequency of the current harmonics $f_1$ is expressed as $$f_1 = \omega_n \frac{N_r}{60} = \omega_n \frac{|u|}{60} = |u|f_{mech} \tag{3}$$

where $N_r$ is the number of rotor poles and $\omega_n$ is the shaft rotational angular speed. With the rotational speed of 1800 rpm, the temporal order of 10 corresponds to the fundamental current harmonics of 300 Hz. In FIG. 2, the analysis only shows quadrant 1 and 4 of 2D FFT because the other quadrants are redundant.

The surface deformation $D_{uv}$ of SRM at temporal order u and spatial order v is proportional to the amplitude of radial force density at the same temporal and spatial orders. Further, the acoustic noise of SRM $\Pi(v, u)$ is proportional to the square of the surface deformation, which is expressed as $$\prod(v, u) = p_0 c_0 \left(\frac{\omega_{f(v,u)}D_{(v,u)}}{\sqrt{2}}\right)^2 \sigma_r(v, u)A_s \tag{4}$$

where $p_0$ is the mass density of air, $c_0$ is the speed of sound in air, $\omega_f$ is the angular forcing frequency in v and u, and $A_s$ is the sound radiation surface area. The acoustic noise at temporal order u, $\hat{\Pi}(u)$, is the summation of acoustic noise from different modes, which is expressed as $$\hat{\Pi}(u) = \Sigma_{v=0}^{v=\infty} \Pi(v,u) \quad (5)$$

Therefore, in summary, the radial force density amplitude at specific temporal order or current harmonics is proportional to the deformation, vibration, and the acoustic noise at the specific temporal order or current harmonics.

The coupling of radial force density between the phases can be assumed as small, thus it can be neglected. The second assumption is that the currents excited at three phases are identical. Then, the analysis of the radial force density can be simplified into one stator tooth since the waveform is identical and periodical. The radial force of one stator tooth $F_r(t)$ can be calculated by integrating equation (2), which is expressed as $$F_r(t) = \oint \sigma_r(t,a) dS = L_{stk} r \Sigma_{i=1}^{n} \sigma_r(t,i) \Delta a \quad (6)$$

where dS is the differential sized part of the stator surface, $L_{stk}$ is the stack length, r is the radius of the air gap center, and $\Delta \alpha$ is the angle difference between two spatial points. Utilizing the calculated radial force by equation (6), the analysis becomes simpler with only the temporal order or the current harmonics.

FIG. 3A shows a graphical representation of an example of the radial force acting at one stator tooth by the conventional square current and FIG. 3B shows its FFT analysis. Based on the measurement, the 6/10 pole SRM operated at rated speed of 1800 rpm and rated torque of 4.8 Nm has significant acoustic noise at 600 Hz, 1200 Hz, 1500 Hz, 2100 Hz, and 2400 Hz. With the fundamental current of 300 Hz, the significant noise occurs at the $2^{nd}$, $4^{th}$, $5^{th}$, $7^{th}$, and $8^{th}$ harmonics of current excitation. Therefore, the acoustic noise at the $2^{nd}$, $4^{th}$, $5^{th}$, $7^{th}$ and $8^{th}$ of current harmonics must be reduced.

FIG. 4 shows a graphical representation of an example of the radial force harmonics of the conventional square current in decibel units and the vibration harmonics analyzed by FEA. To analyze the relationship of radial force and vibration, only $2^{nd}$ harmonics of radial force is modified from the original amplitude of 100% to 75%, 50%, and 25%, respectively. The reduction of the radial force amplitude is carried out to all stator teeth. As shown in FIG. 4, the reduction of $2^{nd}$ harmonic of radial force amplitude only influences the vibration at $2^{nd}$ harmonic. As the radial force amplitude is reduced, the vibration is also reduced. Therefore, based on FEA, the radial force harmonic and vibration harmonic has proportional relationship.

Similar analysis is carried out to the $4^{th}$ harmonic of radial force. FIG. shows a graphical representation of an example of the relationship of radial force with modified amplitude at the $4^{th}$ harmonic and the FEA result of the $4^{th}$ harmonic of vibration. From FIG. 5, the $4^{th}$ harmonic of radial force also has a proportional relationship with the vibration at $4^{th}$ harmonic. FIG. 6 shows a graphical representation of an example of a summary of the relationship between radial force and the FEA result of vibration at $2^{nd}$, $4^{th}$, $5^{th}$, $7^{th}$ and $8^{th}$ harmonics. All radial force harmonics and vibration have an identical relationship. From this analysis, it can be summarized that reducing specific harmonic of radial force can reduce the vibration and the acoustic noise of SRM.

FIGS. 7A and 7B show graphical representations of an example of the radial force of one stator tooth in the SRM by exciting several constant DC currents in FEA. The aligned and unaligned positions illustrated in FIG. 7A are 0° and 180° of the electrical rotor positions respectively. The 6/10 pole SRM is operated in magnetically saturated conditions. As the current increases, the relationship between the radial force and current becomes nonlinear. In this case, the radial force approximation is carried out to simplify the relationship between the radial force, electrical position, and current. Though the following description explains the method for up to $7^{th}$ order harmonic cancelation, the method is applicable to any number of harmonics.

The radial force at one stator tooth with respect to the electrical rotor position is approximated by using the Fourier series equation expressed as $$F_{rA} = K_{r0}(i) + K_{r1}(i)\cos\theta + \ldots + K_{r7}(i)\cos 7\theta \quad (7)$$

where $\theta$ is the electrical rotor position and $K_{r0}$, $K_{r1}$, $K_{r2}$, $K_{r3}$, $K_{r4}$, $K_{r5}$, $K_{r6}$, and $K_{r7}$ are the polynomial functions of current i. The radial force with respect to the current is approximated by the polynomial functions. The polynomial functions of $K_{rn}$ with n=0, 1, 2, ..., 7 are expressed as $$K_{r0}(i) = K_{r07}i^8 + K_{r06}i^7 + \ldots + K_{r03}i^3 + K_{r02}i^2 + K_{r01}i \quad (8)$$

$$K_{r1}(i) = K_{r17}i^8 + K_{r16}i^7 + \ldots + K_{r13}i^3 + K_{r12}i^2 + K_{r11}i \quad (9)$$

$$K_{r2}(i) = K_{r27}i^8 + K_{r26}i^7 + \ldots + K_{r23}i^3 + K_{r22}i^2 + K_{r21}i \quad (10)$$

$$K_{r3}(i) = K_{r37}i^8 + K_{r36}i^7 + \ldots + K_{r33}i^3 + K_{r32}i^2 + K_{r31}i \quad (11)$$

$$K_{r4}(i) = K_{r47}i^8 + K_{r46}i^7 + \ldots + K_{r43}i^3 + K_{r42}i^2 + K_{r41}i \quad (12)$$

$$K_{r5}(i) = K_{r57}i^8 + K_{r56}i^7 + \ldots + K_{r53}i^3 + K_{r52}i^2 + K_{r51}i \quad (13)$$

$$K_{r6}(i) = K_{r67}i^8 + K_{r66}i^7 + \ldots + K_{r63}i^3 + K_{r62}i^2 + K_{r61}i \quad (14)$$

$$K_{r7}(i) = K_{r77}i^8 + K_{r76}i^7 + \ldots + K_{r73}i^3 + K_{r72}i^2 + K_{r71}i \quad (15)$$

where coefficients $K_{rxy}$ with x=0, 1, 2, 3, ..., 7 and y=0, 1, 2, 3, ..., 7 are constants.

Referring to FIG. 7A, the radial force approximation in the relationship between the radial force and the electrical rotor position is expressed as $F_{rA-\theta}$. As shown in FIG. 7B, the radial force approximation in the relationship between the radial force and the current is expressed as $F_{rA-i}$. FIG. 8 shows an approximation of $K_{r0}$ and $K_{r1}$ by the polynomial function of current i. The radial force approximation is completed by substituting (8)-(15) into (7). As shown in FIG. 7A, the maximum error of the radial force approximation is 0.052 pu or 5.2% at 2 A and 354° of the electrical rotor position.

With the above background in consideration, there remains a need for an efficient, reliable and cost-effective system for reducing vibration and acoustic noise in an SRM. Such a system would be designed to reduce specific harmonics of radial force acting at stator teeth to minimize the vibration and acoustic noise in the SRM. Further, such a system would be operated at high temperature and high rotational speed. Such a system would not require additional components for improving system performance level and for reducing the acoustic noise created in the SRM. Moreover, such a system is described to reduce the acoustic noise at the $2^{nd}$, $4^{th}$, $5^{th}$, $7^{th}$ and $8^{th}$ harmonics of current excitation where significant acoustic noise would occur for an example embodiment, though the method is not limited to only these harmonics. Those skilled in art can apply the proposed innovation to reduce any other combination of harmonics of interests. Such a system would implement several techniques for enhancing system efficiency and for reducing torque ripple. The present embodiment overcomes shortcomings in the field by accomplishing these critical objectives.

SUMMARY OF THE DISCLOSURE

To minimize the limitations found in the prior art, and to minimize other limitations that will be apparent upon the reading of this specification, the present invention provides an acoustic noise reduction system for reducing vibration and acoustic noise in a switched reluctance motor (SRM). The SR drive with the acoustic noise reduction system derives an optimum current waveform that reduces the amplitude of $2^{nd}$, $4^{th}$, $5^{th}$, $7^{th}$ and $8^{th}$ harmonics of radial force. This is just an example and not a limitation of the method. The users can select any specific harmonics of their interests and use the method for vibration and acoustic noise reduction for their application. The acoustic noise reduction system includes the SRM having at least one stator pole and at least one rotor pole, an SRM inverter connected to the SRM and a processor. The processor includes digital processors, microprocessors, microcontrollers, ASIC, FPGA, or any other analog or digital circuitry that is responsible for determining and supplying voltages and currents to the motor. The processor is installed an acoustic noise reduction application that enables the processor to derive the optimum current waveform and current regulation.

The SRM is driven by the SRM inverter. A shaft of the SRM is connected to the load. In the preferred embodiment, the load can be fans, pumps, blowers or some other load machines.

The preferred acoustic noise reduction system utilizes a method for reducing the vibration and acoustic noise in the SRM. The preferred method includes four main steps. In the first step, a plurality of reference currents, $i^{ref}$, is generated by a reference current generation module at the processor utilizing a Fourier series equation expressed as $$i_{ref} = i_0 + \Sigma_{n=1}^{n=\infty} i_n \sin(n\theta + \varphi_n) \quad (16)$$

Where n=1, 2, . . . , $i_0$ and $i_n$ are the amplitudes of current components and $\varphi_n$ are the phase shifts.

Step 2 of the acoustic noise reduction method includes calculating maximum rate of change of current $$\frac{di_{max}}{d\theta}$$

by considering the influence of back electromotive force $V_{emf}$ and limited input dc voltage $V_{dc}$ towards the current waveform utilizing a maximum current rate calculation module at the processor. The maximum rate of change of current is expressed as $$\frac{di_{max}}{d\theta} = \frac{V_{dc} - Ri - V_{emf}}{\omega_n L(\theta, i)}$$

where R denotes the coil resistance, $\omega_n$ represents shaft rotational angular speed, $\theta$ denotes electrical rotor position and $L(\theta, i)$ denotes nonlinear inductance of SRM. In general, the equation for calculating the maximum rate of change of current $$\frac{di_{max}}{d\theta} = \frac{V_{dc} - Ri - V_{emf}}{\omega_n L(\theta, i)}$$

predicts the possibility of the maximum peak current at certain electrical rotor position $\theta$ by considering the limited input DC voltage $V_{dc}$, back electromotive force $V_{emf}$ and the rotational speed con. The outcome of step 2 is at least one current profile $i_{cal}(\theta)$ generated by a current profile calculation module at the processor. The at least one current profile is affected by the influence of $V_{emf}$ and the input DC voltage $V_{dc}$.

In step 3, an average torque of the SRM and the radial force harmonics of one stator tooth are calculated. A torque generation module at the processor determines the average torque of the SRM. A torque checking module at the processor checks whether the average torque satisfies an optimum torque condition. The optimum torque condition is satisfied when the average torque attains an optimum value. In the preferred embodiment, the optimum value is 4.8 Nm. A radial force calculation module at the processor calculates the radial force at one stator tooth if the calculated average torque satisfies the optimum torque condition.

A radial force harmonics calculation module at the processor calculates radial force harmonics. In the preferred embodiment, the radial force calculation focuses on the radial force harmonics acting at one stator tooth by FFT. The steps 1, 2, and 3 are repeated with respect to the number of combination of parameters $i_0$, $i_n$, and $\varphi_n$. Finally, in step 4, an optimum current waveform selection module at the processor selects the at least one current profile as the optimum current waveform $I_{cal}$ if the at least one current profile generates the average torque satisfying the optimum torque condition and creates the radial force with minimum amplitude at $2^{nd}$, $4^{th}$, $5^{th}$, $7^{th}$ and $8^{th}$ harmonics of current excitation. Since the vibration and acoustic noise at specific harmonics of current excitation in SRM are in a proportional relationship with the radial force harmonics acting at the stator teeth, a reduction in the amplitude of the specific radial force harmonics utilizing the optimum current waveform minimizes the vibration and acoustic noise in the SRM.

The preferred optimum current has been derived to reduce the radial force harmonics of $2^{nd}$, $4^{th}$, $5^{th}$, $7^{th}$ and $8^{th}$, which are the harmonics where the significant acoustic noise occurred when the SRM is driven by the conventional square current. Several experimental results show significant reduction at the highest and second highest peak noises at $2^{nd}$ and $7^{th}$ harmonics or 600 Hz and 2100 Hz by 6.18 dB and 5.76 dB, respectively. The maximum reduction of acoustic noise is realized at $5^{th}$ harmonics or 1500 Hz by −21.17 dB.

To improve the efficiency of the acoustic noise reduction system, turn-on and turn-off angles are introduced. By adding the turn-on and turn-off angles in the optimum current waveform, the efficiency is improved up to 1.43%.

It is a first objective of the present invention to provide an efficient, reliable and cost-effective acoustic noise reduction system for reducing vibration and acoustic noise in SRM.

A second objective of the present invention is to provide an acoustic noise reduction system designed for selectively reducing specific harmonics of radial force acting at the stator teeth to minimize the vibration and acoustic noise in SRM.

A third objective of the present invention is to provide an acoustic noise reduction system adaptable to operate at high temperature and at high rotational speed.

A fourth objective of the present invention is to provide an acoustic noise reduction system that does not require additional components thereby improving system performance.

A fifth objective of the present invention is to provide an acoustic noise reduction system that reduces the acoustic noise at $2^{nd}$, $4^{th}$, $5^{th}$, $7^{th}$ and $8^{th}$ harmonics of current excitation where significant acoustic noise occurred when the SRM is driven by the conventional square current.

Another objective of the present invention is to provide an acoustic noise reduction system designed to implement several techniques for enhancing system efficiency and for reducing torque ripple.

These and other advantages and features of the present invention are described with specificity so as to make the present invention understandable to one of ordinary skill in the art.

BRIEF DESCRIPTION OF THE DRAWINGS

In order to enhance their clarity and improve understanding of these various components and embodiments of the invention, elements in the figures have not necessarily been drawn to scale. Furthermore, elements that are known to be common and well understood to those in the industry are not depicted in order to provide a clear view of the various embodiments of the invention. Thus, the drawings are generalized in form in the interest of clarity and conciseness.

DETAILED DESCRIPTION OF THE DRAWINGS

In the following discussion that addresses a number of embodiments and applications of the present invention, reference is made to the accompanying drawings that form a part hereof, and in which is shown by way of illustration specific embodiments in which the invention may be practiced. It is to be understood that other embodiments may be utilized and changes may be made without departing from the scope of the present invention.

Various inventive features are described below that can each be used independently of one another or in combination with other features. However, any single inventive feature may not address any of the problems discussed above or only address one of the problems discussed above. Further, one or more of the problems discussed above may not be fully addressed by any of the features described below.

As used herein, the singular forms "a", "an" and "the" include plural referents unless the context clearly dictates otherwise. "And" as used herein is interchangeably used with "or" unless expressly stated otherwise. As used herein, the term 'about" means +/−5% of the recited parameter. All embodiments of any aspect of the invention can be used in combination, unless the context clearly dictates otherwise.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "wherein", "whereas" "above," and "below" and words of similar import, when used in this application, shall refer to this application as a whole and not to any particular portions of the application.

The description of embodiments of the disclosure is not intended to be exhaustive or to limit the disclosure to the precise form disclosed. While the specific embodiments of, and examples for, the disclosure are described herein for illustrative purposes, various equivalent modifications are possible within the scope of the disclosure, as those skilled in the relevant art will recognize.

Figure 1:
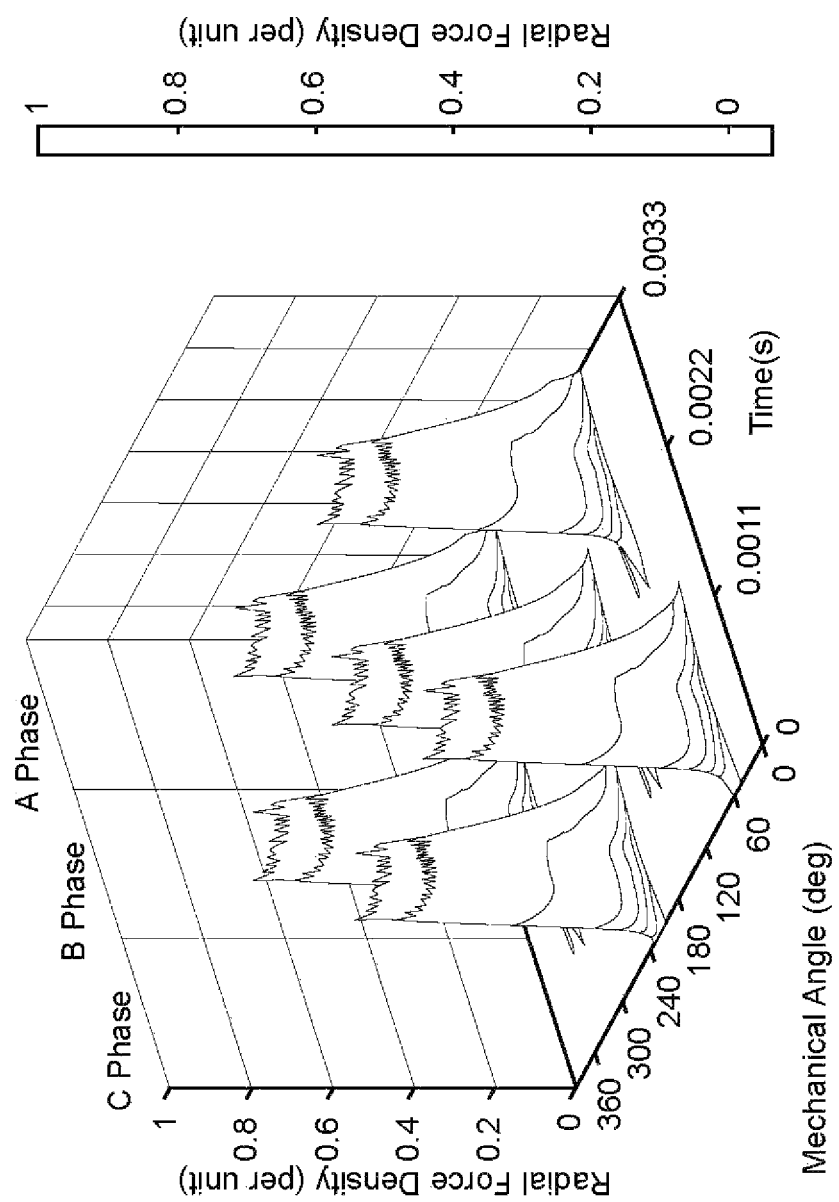
FIG. 1 shows a graphical representation of an example of radial force density of a three-phase 6/10 pole SRM excited by a conventional square current.
Figure 2:
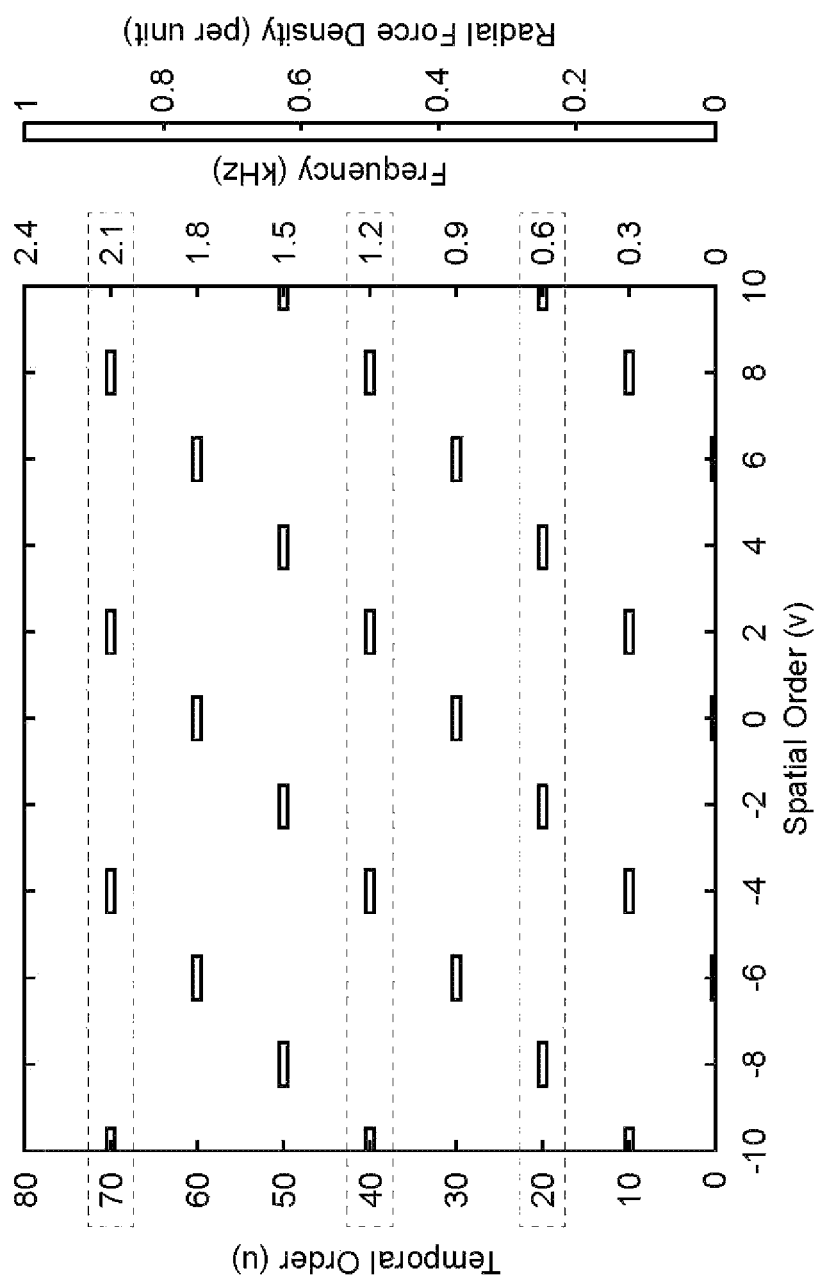
FIG. 2 shows a graphical representation of an example of a 2D-FFT analysis of the radial force density illustrated in FIG. 1.
Figure 3A:
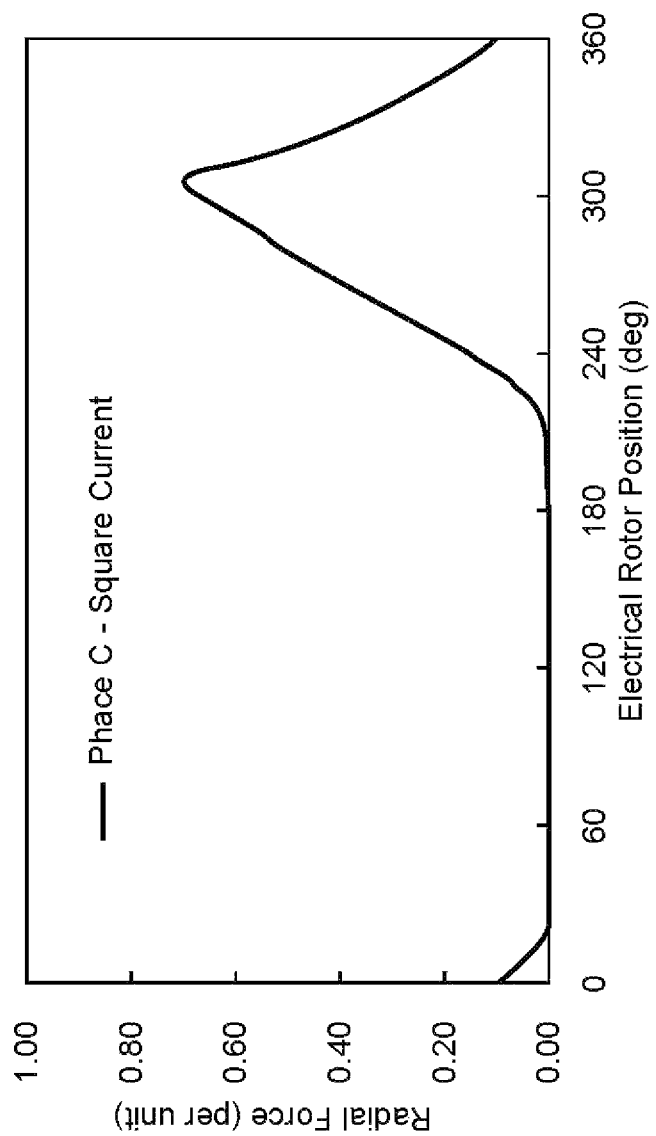
FIG. 3A shows a graphical representation of an example of the radial force acting at one stator tooth by the conventional square current.
Figure 3B:
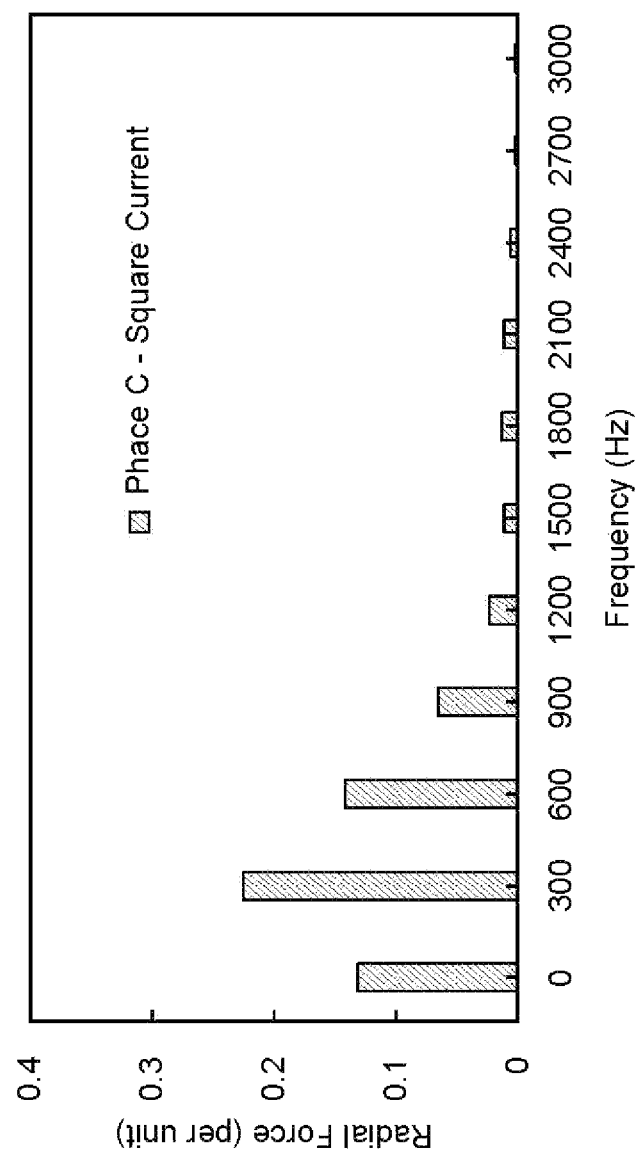
FIG. 3B shows a graphical representation of an example of FFT analysis of the radial force illustrated in FIG. 3A.
Figure 4:
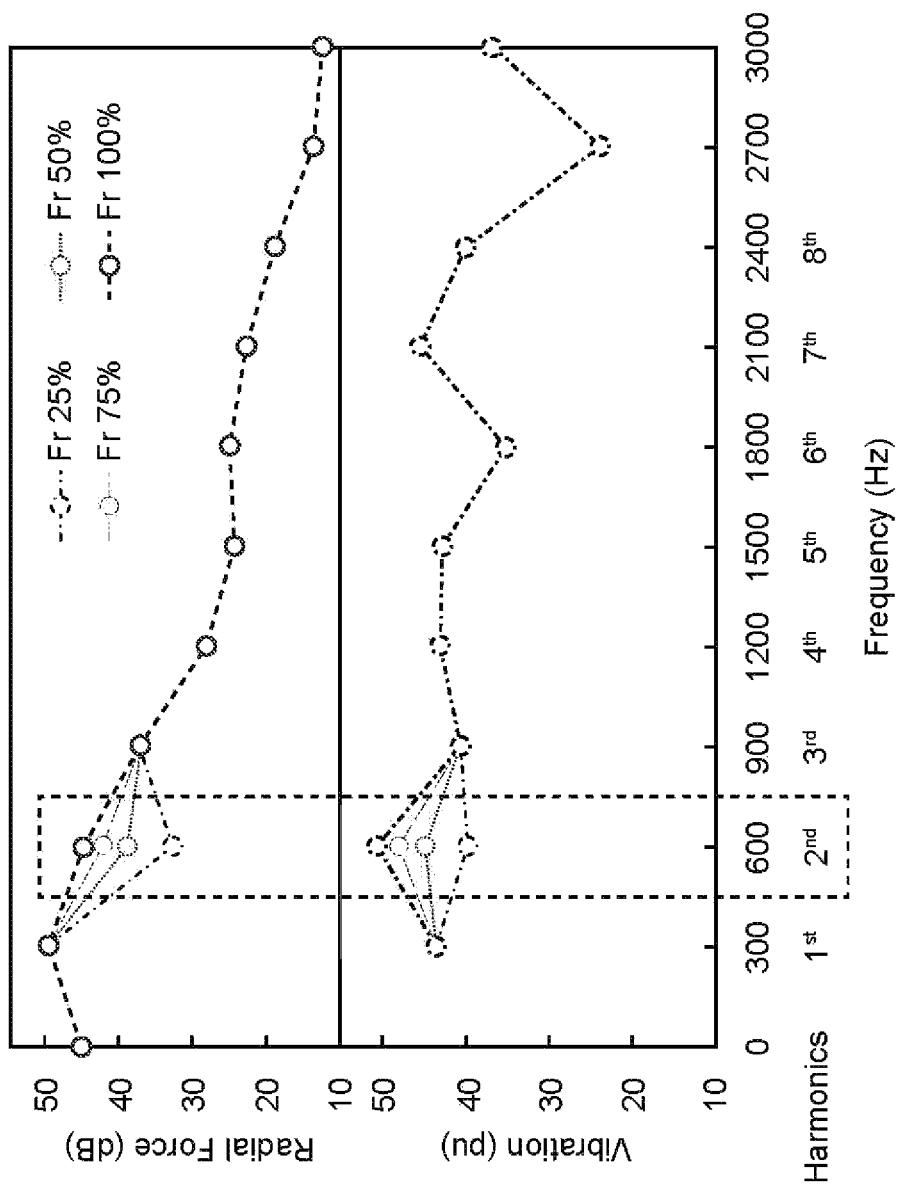
FIG. 4 shows a graphical representation of an example of the relationship of a $2^{nd}$ harmonic of the radial force and the FEA result of a $2^{nd}$ harmonic of vibration.
Figure 5:
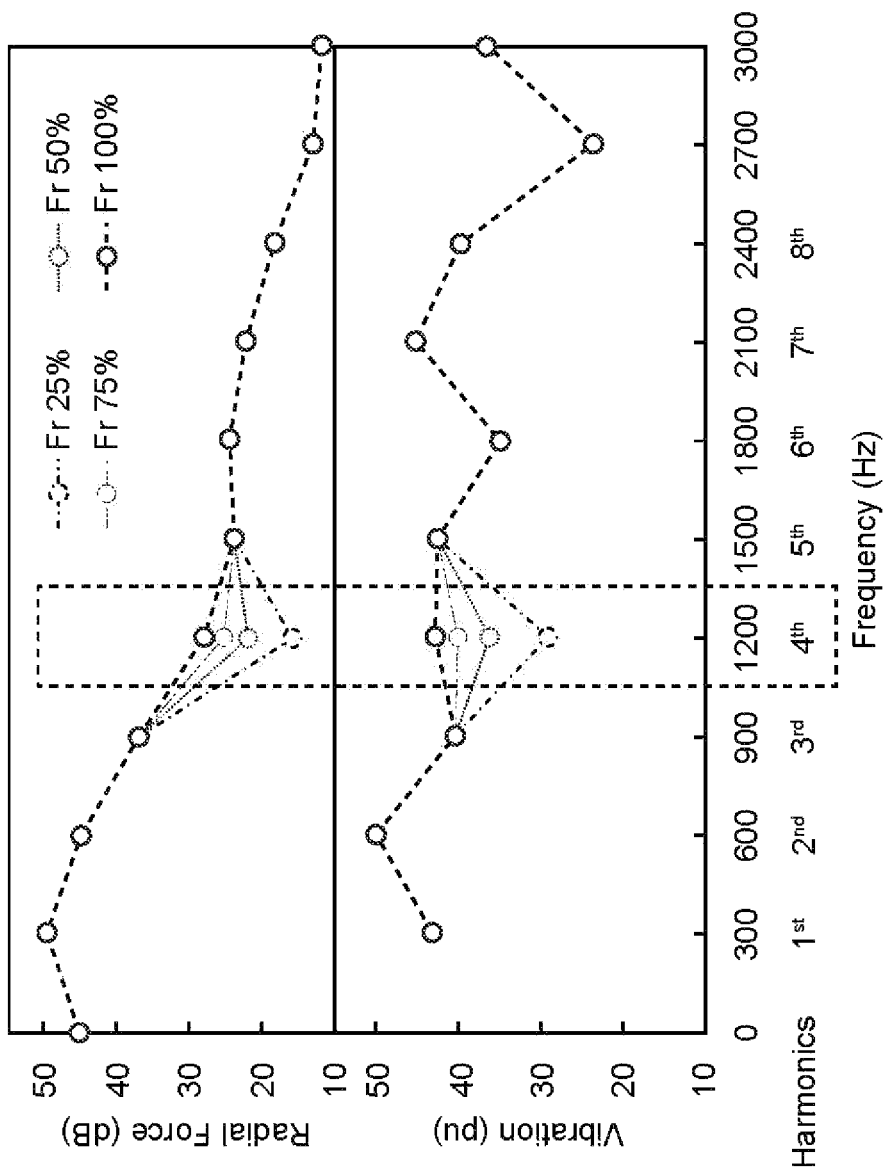
FIG. 5 shows a graphical representation of an example of the relationship of a $4^{th}$ harmonic of the radial force and the FEA result of a $4^{th}$ harmonic of vibration.
Figure 6:
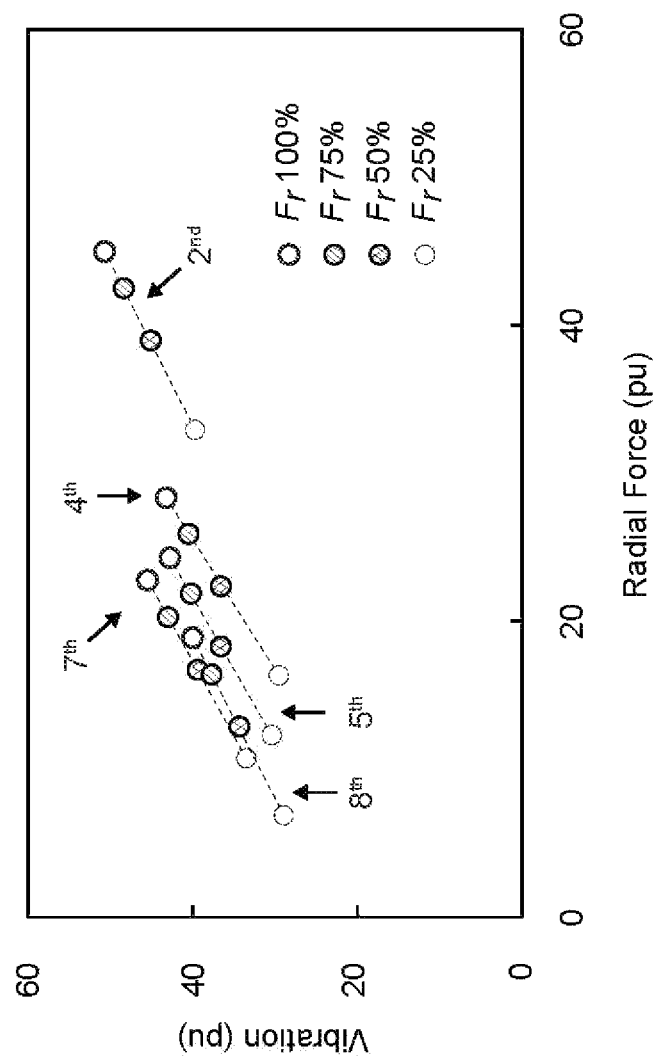
FIG. 6 shows a graphical representation of an example of a summary of the relationship between the radial force and FEA result of vibration at the $2^{nd}$, $4^{th}$, $5^{th}$, $7^{th}$ and $8^{th}$ harmonics.
Figure 7A:
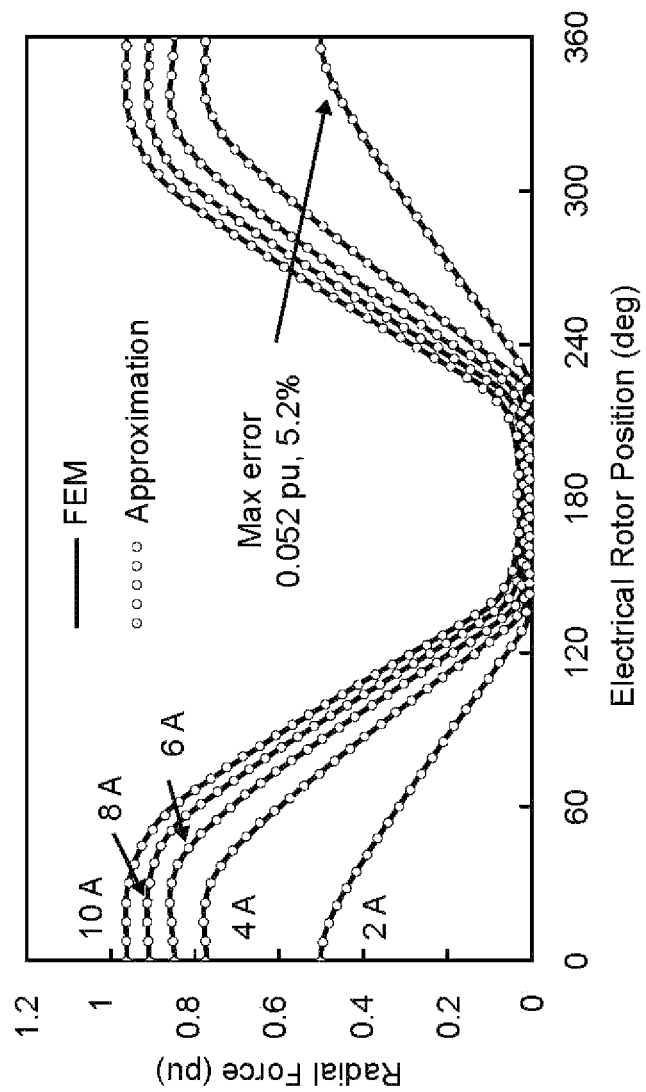
FIG. 7A shows a graphical representation of an example of the radial force approximation in the relationship between the radial force and the electrical rotor position.
Figure 7B:
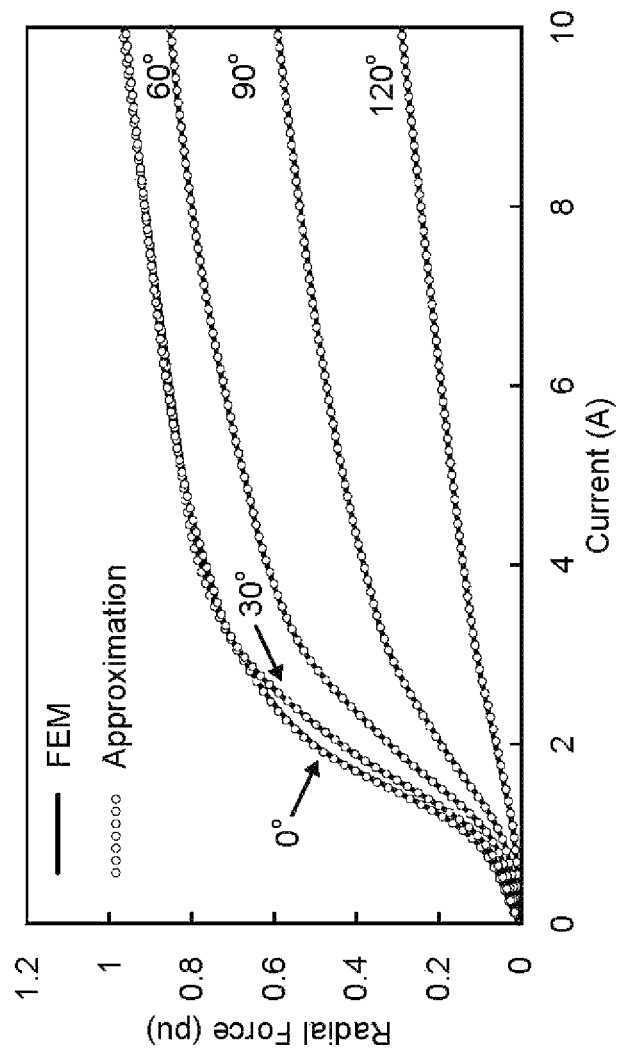
FIG. 7B shows a graphical representation of an example of the radial force approximation in the relationship between the radial force and the current.
Figure 8:
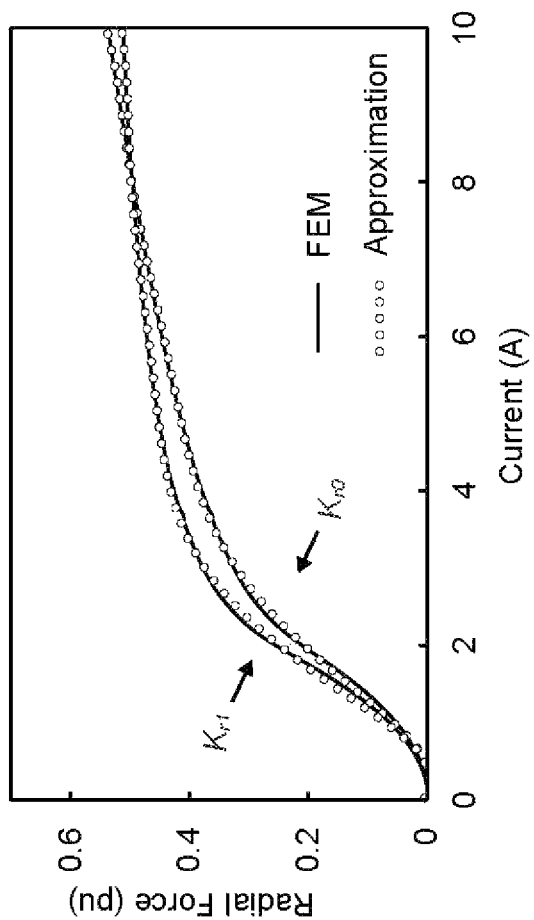
FIG. 8 shows a graphical representation of an example of an approximation of the radial force by the polynomial functions $K_{r0}$ and $K_{r1}$ of current i.
Figure 9A:
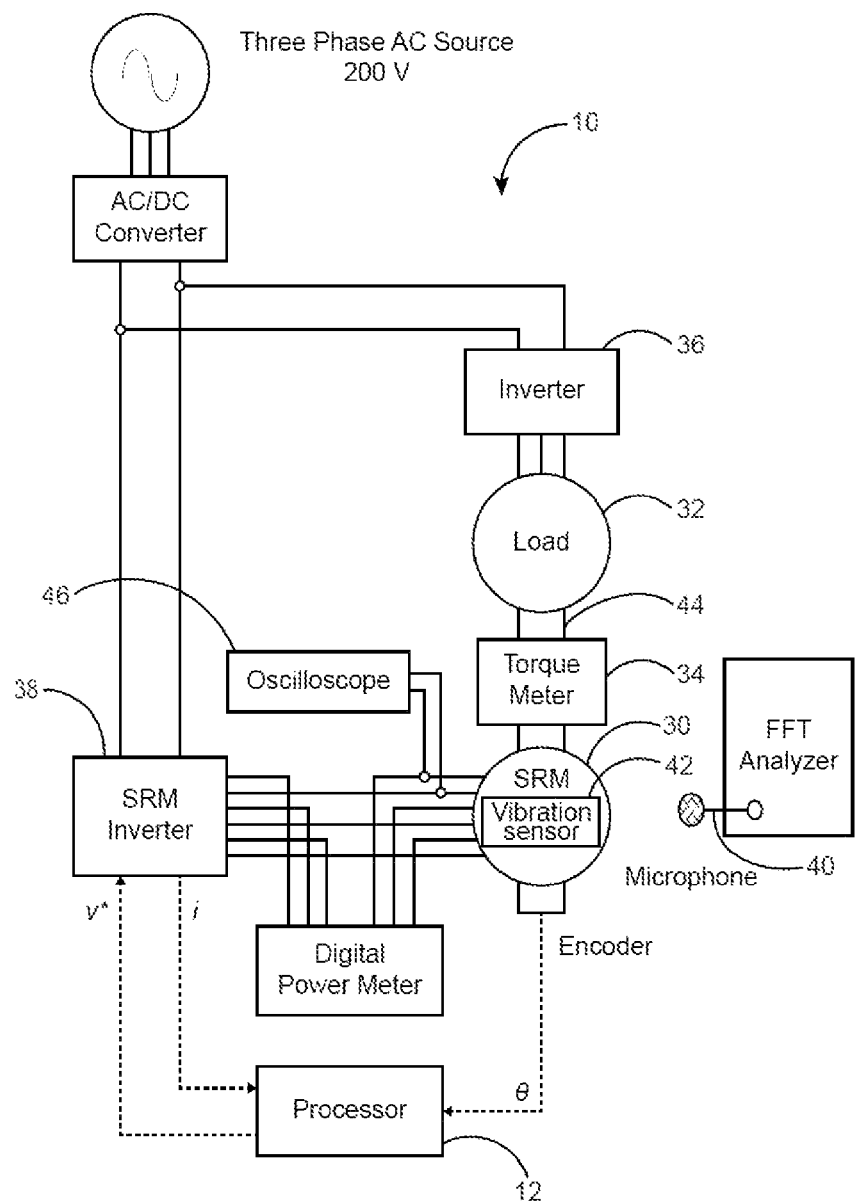
FIG. 9A shows a block diagram of an acoustic noise reduction system for experiment purpose reducing vibration and acoustic noise in a switched reluctance motor (SRM)
Figure 9B:
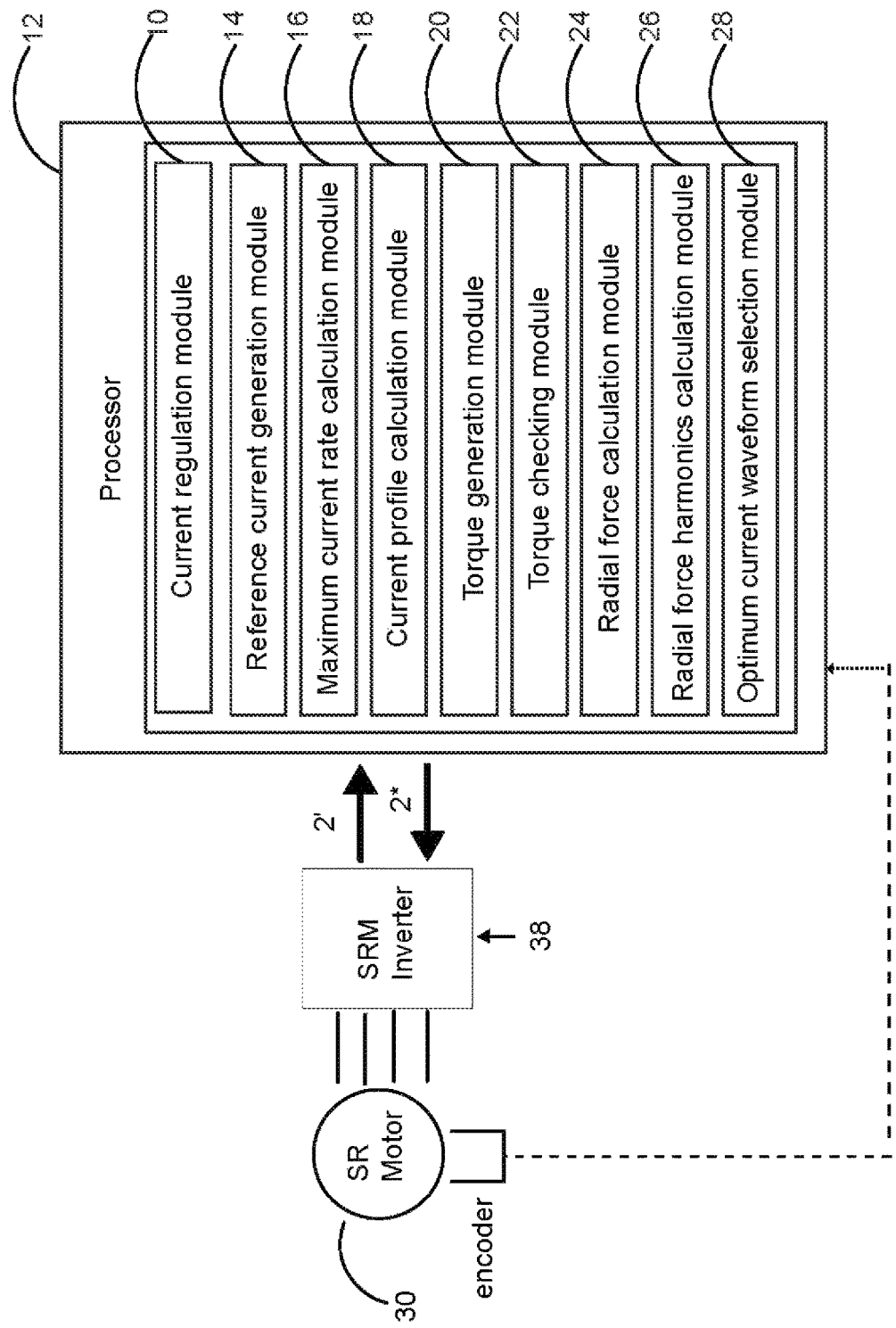
FIG. 9B shows the SR drive with a block diagram of a processor with the acoustic noise reduction system in accordance with the preferred embodiment of the present invention.

Referring to FIG. 9A an experimental setup 10 for reducing vibration and acoustic noise in a switched reluctance motor (SRM) 30 is illustrated. In 9B, the SR drive 10' is illustrated. The SR drive includes processor, SRM inverter, SR motor and rotary encoder. The encoder detects the rotary position of the SR motor shaft. The encoder can be replaced by a module to estimate the rotational position based on voltage and current at SR motor terminals. The SRM inverter is supplied by DC power source, which may be composed by a diode rectifier, a PWM rectifier, battery, or etc. The SRM inverter detects currents and provide these to the processor 12. The processor is providing voltage switching signals v*. The SRM inverter provides voltage and currents to the SR motor 30. In the processor, the current regulation module generates voltage switching signals v* based on the detected currents i and the reference current generated by the reference current generation module 14. Other modules 16, 18, 20, 22, 24, 26 and 28 may carry out the calculation at off line as the calculation power is needed. The calculation can be real time if processor power is high enough. The processor 12 derives an optimum current waveform that reduces the amplitude of the $2^{nd}$, $4^{th}$, $5^{th}$, $7^{th}$ and $8^{th}$ harmonics of radial force.

The experimental setup 10 includes the SRM 30 having at least one stator pole and at least one rotor pole, a load 32 connected to the SRM 30 through a torque meter 34, a three-phase inverter 36 connected to the load 32 to control rotational speed of the load 32, an SRM inverter 38 connected to the SRM 30 and a processor 12. The processor 12 has installed on it an acoustic noise reduction application that enables the system 10 to derive the optimum current waveform. The processor includes a reference current generation module 14, a maximum current rate calculation module 16, a current profile calculation module 18, a torque generation module 20, a torque checking module 22, a radial force calculation module 24, a radial force harmonics calculation module 26 and an optimum current waveform selection module 28. The experimental setup 10 further comprises a microphone 40 and a vibration sensor 42.

As shown in FIG. 9A, a shaft 44 of the SRM 30 is connected to the torque meter 34. In the preferred embodiment, the load 32 is an induction motor designed to operate as a generator. The induction motor is connected to the shaft 44 of the SRM 30 and is driven by a three-phase inverter 36. The SRM 30 is driven by the SRM inverter 38. Preferably, the SRM inverter 38 is a unidirectional inverter. The microphone 40 is positioned near the SRM 30 for measuring the acoustic noise generated in the SRM 30 and is positioned one meter from the center of the SRM 30 in the radial direction. The vibration sensor 42 is positioned on a surface of the SRM 30 to detect and measure vibrations generated in the SRM 30. An oscilloscope 46 is provided to record and monitor voltages and currents in various coils on the experimental setup 10.

In the preferred embodiment, the SR drive 10' utilizes four main steps for calculating the optimum current waveform. In the first step, a plurality of reference currents, $i_{ref}$, is generated by the reference current generation module 14 utilizing a Fourier series equation expressed as $$i_{ref} = i_0 + \Sigma_{n=1}^{n=\infty} i_n \sin(n\theta + \varphi_n) \qquad (17)$$

where n=1, 1, 2, . . . , $i_0$ and $i_n$ are the amplitudes of current components and $\varphi_n$ are the phase shifts.

Step 2 includes consideration of the influence of back electromotive force $V_{emf}$ and limited input dc voltage $V_{dc}$ towards the current waveform. The maximum current rate calculation module 16 calculates maximum rate of change of current $$\frac{di_{max}}{d\theta}$$

expressed as $$\frac{di \max}{dt} = \frac{V_{dc} - R_i - V_{emf}}{L(\theta, i)} \qquad (18)$$

$$\frac{di_{max}}{d\theta} = \frac{V_{dc} - R_i - V_{emf}}{\omega_n L(\theta, i)}$$

where R denotes the coil resistance, $\omega_n$ represents shaft rotational angular speed, $\theta$ denotes electrical rotor position and $L(\theta, i)$ denotes nonlinear inductance of SRM 30. In general, equation (16) predicts the possibility of the maximum peak current at certain electrical rotor position $\theta$ by considering the limited input DC voltage $V_{dc}$, back electromotive force $V_{emf}$, and the rotational speed con. The outcome of step 2 is at least one current profile $i_{cal}(\theta)$ generated by the current profile calculation module 18. The at least one current profile $i_{cal}(\theta)$ is affected by the influence of $V_{emf}$ and the input DC voltage $V_{dc}$. In step 3, the average torque of SRM 30 and radial force harmonics acting at one stator tooth are calculated. Here, the torque and nonlinear inductance of SRM 30 are calculated by the equation of torque and inductance approximations, which are similar with (7)-(15). The torque generation module 20 determines an average torque of the SRM 30. The torque checking module 22 checks whether the average torque satisfies an optimum torque condition. The optimum torque condition is satisfied when the average torque attains an optimum value. In the preferred embodiment, the optimum value is 4.8 Nm, however values 25% above and below this amount are considered. The radial force calculation module 24 calculates the radial force at one stator tooth if the calculated average torque satisfies the optimum torque condition.

The radial force harmonics calculation module 26 calculates radial force harmonics. In the preferred embodiment, the radial force calculation focuses on the radial force harmonics acting at one stator tooth by FFT. The steps 1, 2, and 3 are repeated with respect to the number of combination of parameters $i_0$, $i_n$, and $\varphi_n$. Finally, in step 4, the optimum current waveform selection module 28 selects the at least one current profile as the optimum current waveform $I_{cal}$ if the at least one current profile generates the average torque satisfying the optimum torque condition and creates the radial force with minimum amplitude at desired harmonics for a specific application of current excitation. Since the radial force harmonics acting at the stator teeth is in a proportional relationship with the vibration and acoustic noise at the specific harmonics of current excitation, a reduction in the amplitude of the specific radial force harmonics utilizing the optimum current waveform minimizes the vibration and acoustic noise in the SRM 30.

Figure 10:
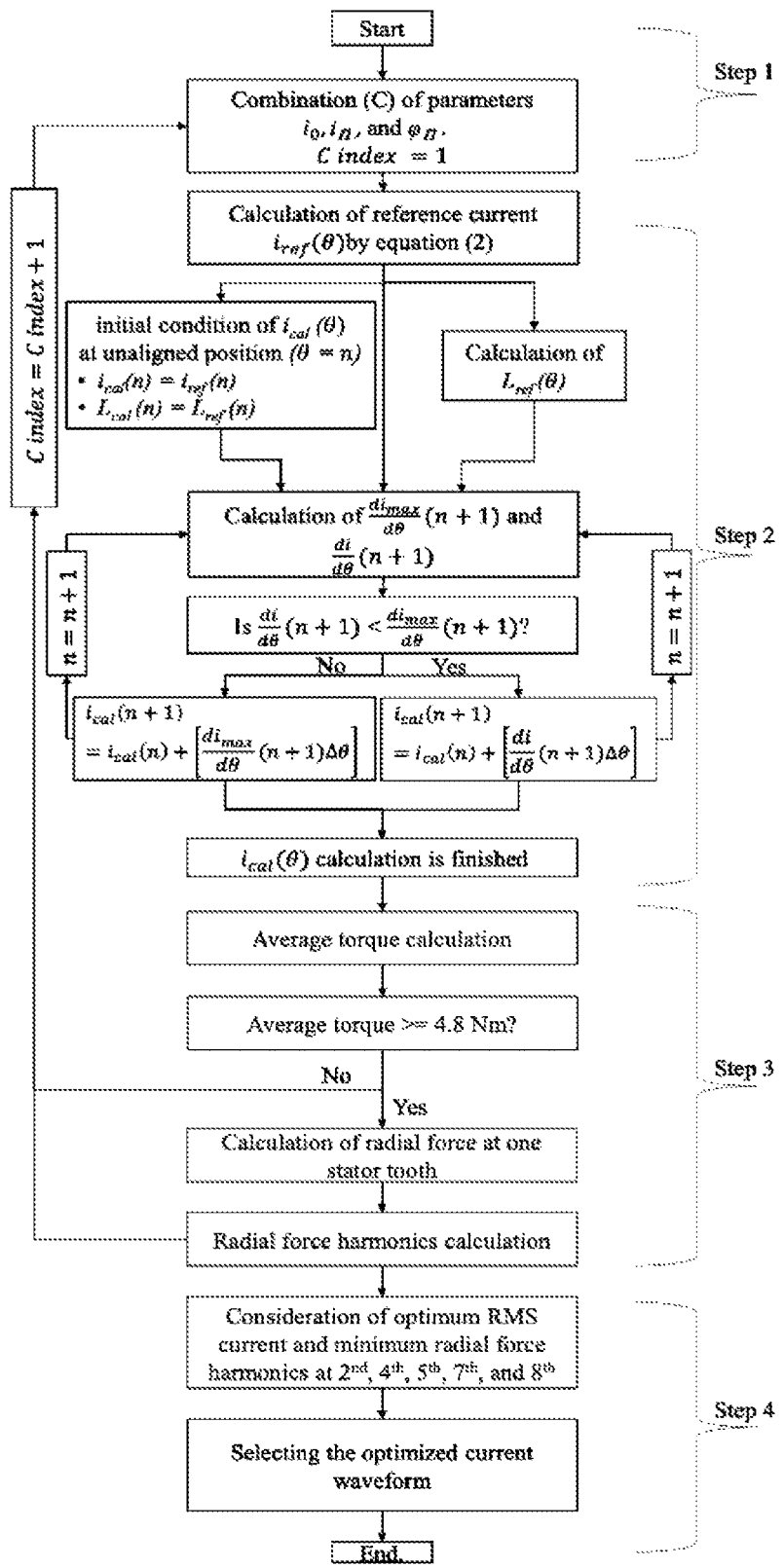
FIG. 10 shows a flowchart of a method for reducing vibration and acoustic noise in the SRM utilizing the acoustic noise reduction system in accordance with the preferred embodiment of the present invention.

FIG. 10 shows a flowchart of a method for reducing vibration and acoustic noise in the SRM 30 utilizing the experimental setup 10. As shown in block 50, a combination (C) of parameters including the amplitudes of current components $i_0$ and $i_n$ and the phase shifts $\varphi_n$ are provided to the reference current generation module. Here, the value of C index is assigned as one. The reference current generation module generates the plurality of reference currents, $i_{ref}$ utilizing these parameters and equation (15) as shown in block 52. A nonlinear inductance of SRM $L_{ref}(\theta)$ is calculated as shown in block 54. Next, an initial condition of current $i_{cal}(\theta)$ at unaligned position ($\theta$=n) is calculated as shown in block 56. Initially, the value of n is assigned as 0. In this step, value of $i_{ref}(n)$ is assigned to $i_{cal}(n)$ and the value of $L_{ref}(n)$ is assigned to $L_{cal}(n)$ as shown below.

$$i_{cal}(n) = i_{ref}(n) \quad (19)$$

$$L_{cal}(n) = L_{ref}(n) \quad (20)$$

Then, the maximum rate of change of current $$\frac{di_{max}}{d\theta}(n+1)$$

and the rate of change of current $$\frac{di}{d\theta}(n+1)$$

are calculated as shown in block 58. Next, the method includes a check operation to verify whether the rate of change of current, $$\frac{di}{d\theta}(n+1)$$

is less man me maximum rate of change of current, $$\frac{di_{max}}{d\theta}(n+1)$$

as shown in block 60. If the rate of change of current $$\frac{di}{d\theta}(n+1)$$

is less than the maximum rate of change of current $$\frac{di_{max}}{d\theta}(n+1),$$

then the at least one profile current $i_{cal}(n+1)$ is calculated utilizing the rate of change of current as shown in block 64 and is expressed by the equation $$i_{cal}(n+1) = i_{cal}(n) + \left[\frac{di}{d\theta}(n+1)\Delta\theta\right].$$

Then, the value of n is incremented by one as shown in block 62 and the process control is navigated to block 58. If the rate of change of current $$\frac{di}{d\theta}(n+1)$$

is greater than the maximum rate of change of current $$\frac{di_{max}}{d\theta}(n+1)$$

then the at least one profile current $i_{cal}(n+1)$ is calculated utilizing the maximum rate of change of current as shown in block 66 and is expressed by the equation $$i_{cal}(n+1) = i_{cal}(n) + \left[\frac{di_{max}}{d\theta}(n+1)\Delta\theta\right].$$

Thereafter, the value of n is incremented by one as shown in block 68 and the process control is navigated to block 58. The processes explained through block 58 to block 66 are repeated for all values of n. Upon repeating these steps, calculation of the profile current $i_{cal}(\theta)$ is finished as shown in block 70. Then, the average torque is calculated by the torque generation module as shown in block 72. Upon calculating the average torque, the torque checking module checks whether the average torque satisfies the optimum torque condition as shown in block 74. In the preferred embodiment, the optimum torque condition is satisfied when the average torque attains 4.8 Nm. If the average torque is less than 4.8 Nm, then the value of C index is incremented by one as shown in block 76 and the process control is navigated to block 50. Thereafter, all the steps described through block 50 to block 74 are repeated. If the average torque is greater than or equal to 4.8 Nm, then the radial force at one stator tooth is calculated by the radial force calculation module as indicated at block 78. Thereafter, the radial force harmonics is calculated at block 80. If the calculated radial force has minimum radial force harmonics, then an optimum RMS current and minimum radial force at the desired harmonics to be considered for cancellation harmonics are considered as shown in block 82. Finally, the optimum current waveform $I_{cal}$ that can generate the required torque and has minimum amplitude of the radial force harmonics at the desired harmonics to be considered for cancellation is selected as indicated at block 84. If the calculated current profile has maximum radial force harmonics, then the value of C index is incremented by one as shown in block 76 and all the steps described through block 50 to block 80 are repeated.

Figure 11:
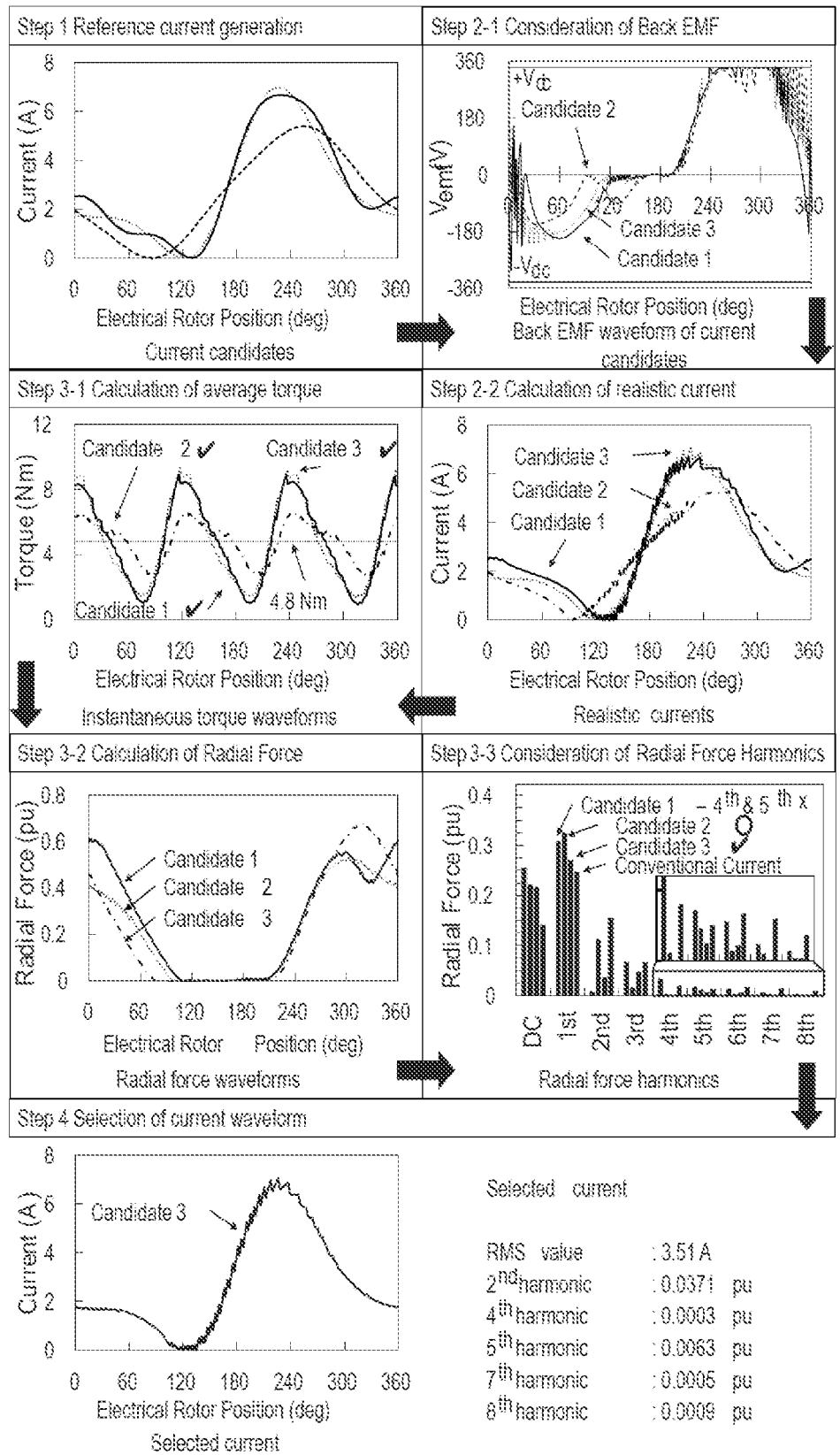
FIG. 11 shows a graphical representation of an example of a summary of the method for reducing vibration and acoustic noise in the SRM in accordance with the preferred embodiment of the present invention.

FIG. 11 shows a graphical representation of a summary of the method for reducing vibration and acoustic noise in the SRM 30. Step 1 shows the candidates of reference current generated utilizing equation (15). Step 2-1 shows the calculation of $V_{emf}$ and step 2-2 shows the final calculation of current waveforms $i_{cal}(\theta)$ affected by high $V_{emf}$ and the limited input DC voltage $V_{dc}$. Step 3-1 shows the calculated average torque. Then, the radial force generated by the current waveforms in step 2 is calculated in step 3-2. Step 3-3 shows the FFT result of the calculated radial force for the analysis of the radial force harmonics. In this example, all current waveforms fulfill the target torque of 4.8 Nm. For the radial force harmonics, current candidate 1 is not recommended because it has a high radial force amplitude in the $4^{th}$ and $5^{th}$ harmonics compared to the conventional square current. The best candidate is number 3 where it has low amplitude of radial force harmonics in the $2^{nd}$, $4^{th}$, $5^{th}$, and $7^{th}$ compared to the conventional square current. Finally, the optimized current waveform is chosen in step 4.

Figure 12:
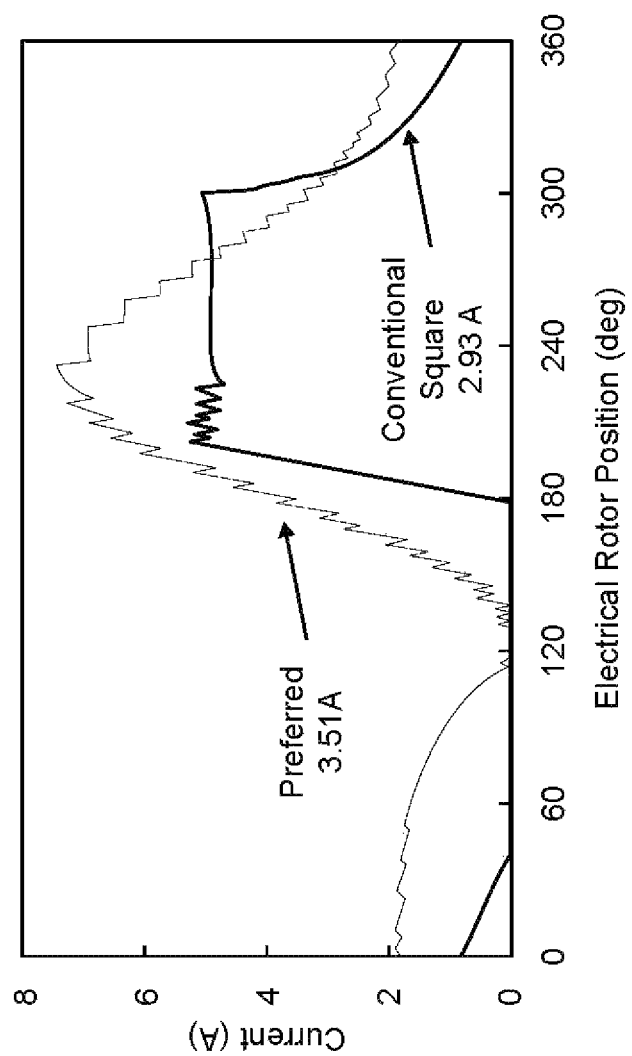
FIG. 12 shows a graphical representation of an example of a comparison of the FEA result of the conventional square current and an optimum current for reducing the vibration and acoustic noise in the SRM in accordance with the preferred embodiment of the present invention.

FIG. 12 shows a graphical representation of an example of a comparison of the driving currents in FEA transient analysis at a rotational speed of 1800 rpm. The conventional square current and the optimum current generate an average torque of 4.8 Nm. The conventional square current is applied with turn-on and turn-off angles of 178° and 303° of the electrical rotor position, respectively. Here, the peak reference current is 5.2 A. The optimum current is generated utilizing the preferred method described in FIG. 10. The optimum current is selected based on the low amplitude of radial force harmonics at the $2^{nd}$, $4^{th}$, $5^{th}$, $7^{th}$, and $8^{th}$ harmonics.

As shown in FIG. 12, the optimum current has RMS value of 3.51 A, which is higher than 2.93 A of the conventional current. The preferred optimum current has a high RMS value because the current is also provided in the negative torque region, which ranges from 0° to 180° of the electrical rotor position in order to obtain low amplitude of radial force harmonics. Consequently, the current in the positive torque region must be increased to compensate for the negative torque. On the other hand, the conventional square current is optimally excited at positive torque region from 0° to 180° of the electrical rotor position. A small portion of the conventional current is excited at negative torque region with the influence of high back electromotive force. As the back electromotive force is high, the conventional current is not able to go to zero instantaneously.

Figure 13:
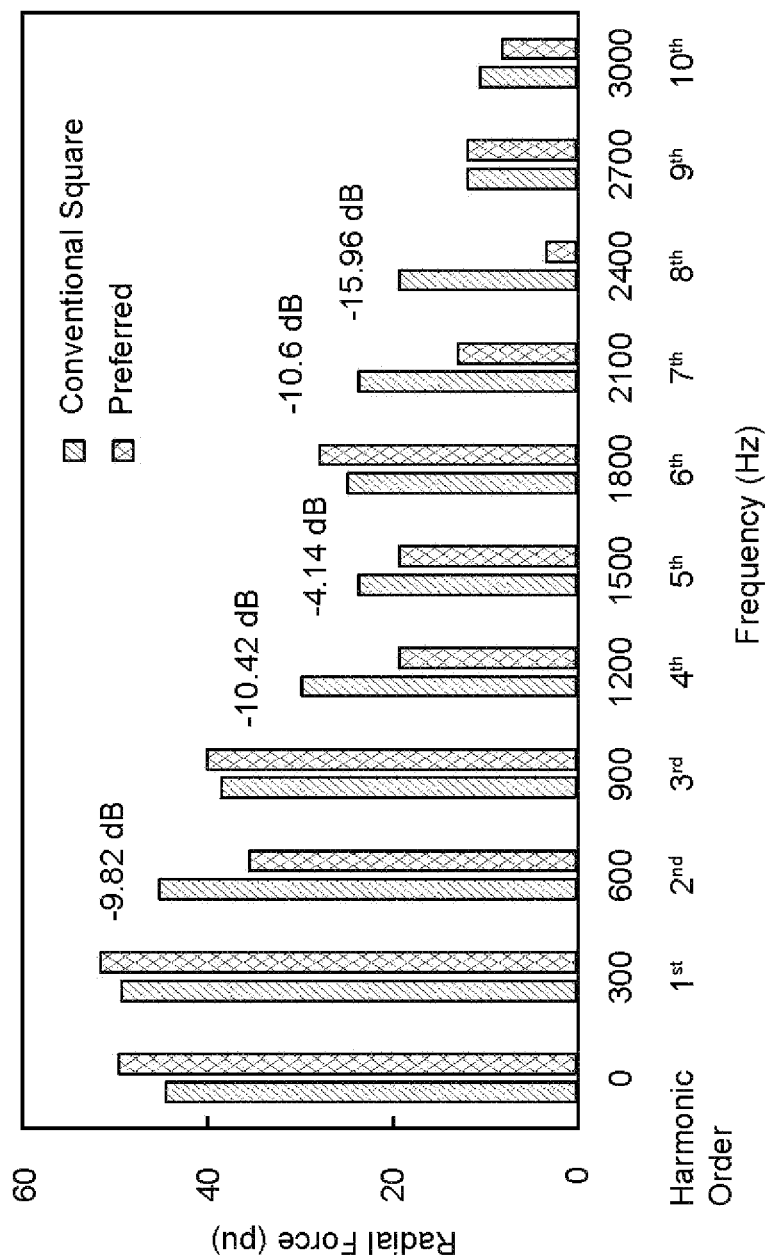
FIG. 13 shows a graphical representation of an example of a comparison of FEA result of radial force harmonics of the conventional square current and the optimum current in accordance with the preferred embodiment of the present invention.

FIG. 13 shows a graphical representation of an example of a comparison between the radial force harmonics of the conventional square current and the preferred optimum current in decibel unit. The analysis was carried out by FEA. In this case, the fundamental frequency of the current harmonic is 300 Hz. This comparison is focused on the most dominant acoustic noise in 6/10 pole SRM, which are the $2^{nd}$, $4^{th}$, $5^{th}$, $7^{th}$, and $8^{th}$ harmonics for the example embodiment. The $2^{nd}$ and $4^{th}$ harmonics of radial force of the preferred optimum current are reduced by −0.16 pu and −0.17 pu, respectively. While the $5^{th}$ and $7^{th}$ harmonics of radial force are reduced by −0.07 pu and −0.18 pu by the preferred optimum current. The radial force at the $8^{th}$ harmonic is reduced by −0.27 pu. In this case, the $3^{rd}$ and $6^{th}$ harmonics of radial force are increased by the optimum current. However, since the $3^{rd}$ and $6^{th}$ harmonics do not generate significant acoustic noise based on this example, the increase of radial force harmonics is acceptable.

Figure 14:
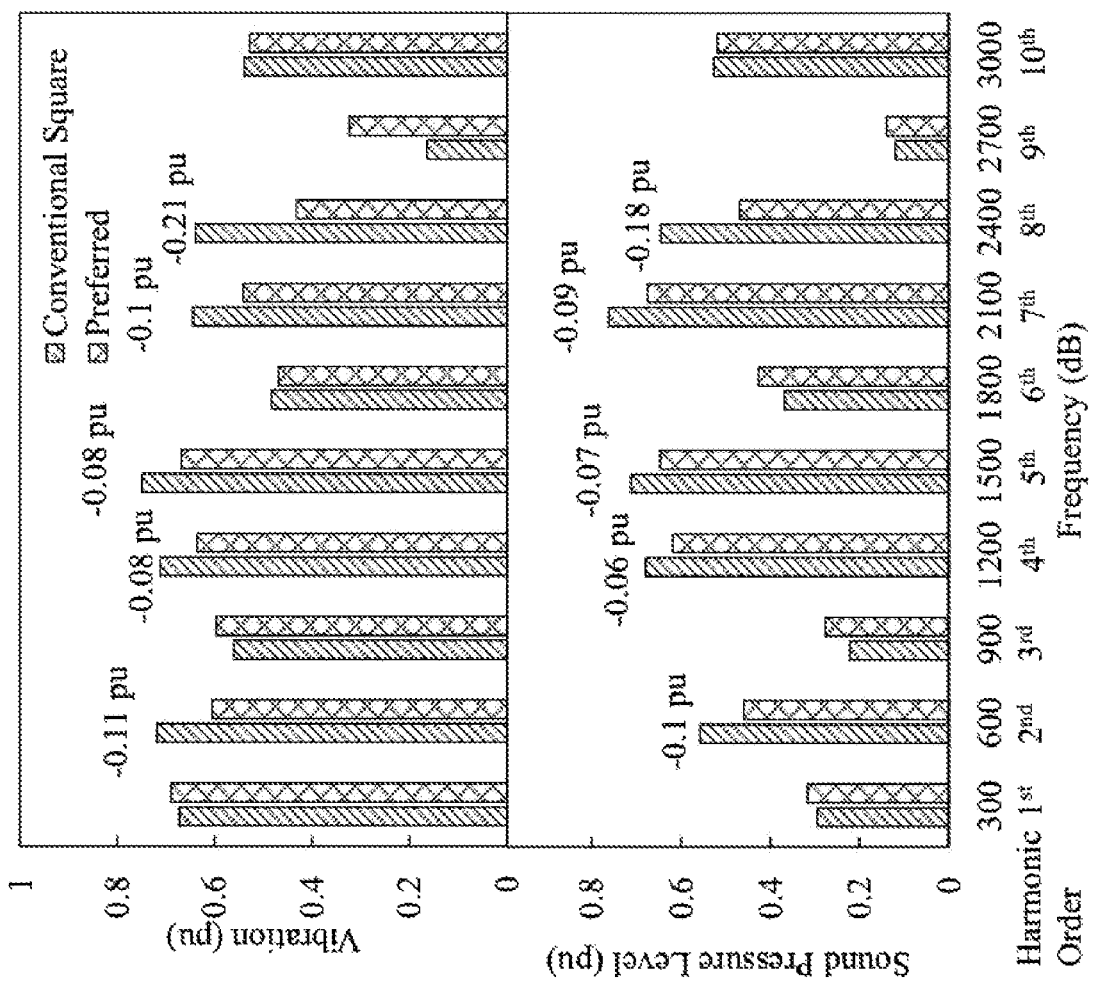
FIG. 14 shows a graphical representation of an example of a comparison of FEA result of vibration and acoustic noise in the conventional square current and in the optimum current in accordance with the preferred embodiment of the present invention.

FIG. 14 shows a graphical representation of an example of a comparison of the FEA results of vibration and acoustic noise from the conventional square current and the preferred optimum current. The analysis was carried out utilizing ANSYS Mechanical. The acoustic noise was measured one meter from the center of the SRM 30 in the radial direction. As shown in FIG. 14, the vibration and acoustic noise of SRM 30 in the $2^{nd}$, $4^{th}$, $5^{th}$, $7^{th}$, and $8^{th}$ harmonics, for the example embodiment, are reduced by the optimum current. Based on the FEA result, the reduction of the acoustic noise is proportional to the reduction of the vibration. The maximum reduction of the vibration and acoustic noise utilizing the preferred optimum current is realized at the $8^{th}$ harmonic by 0.21 pu and −0.18 pu, respectively.

Figure 15:
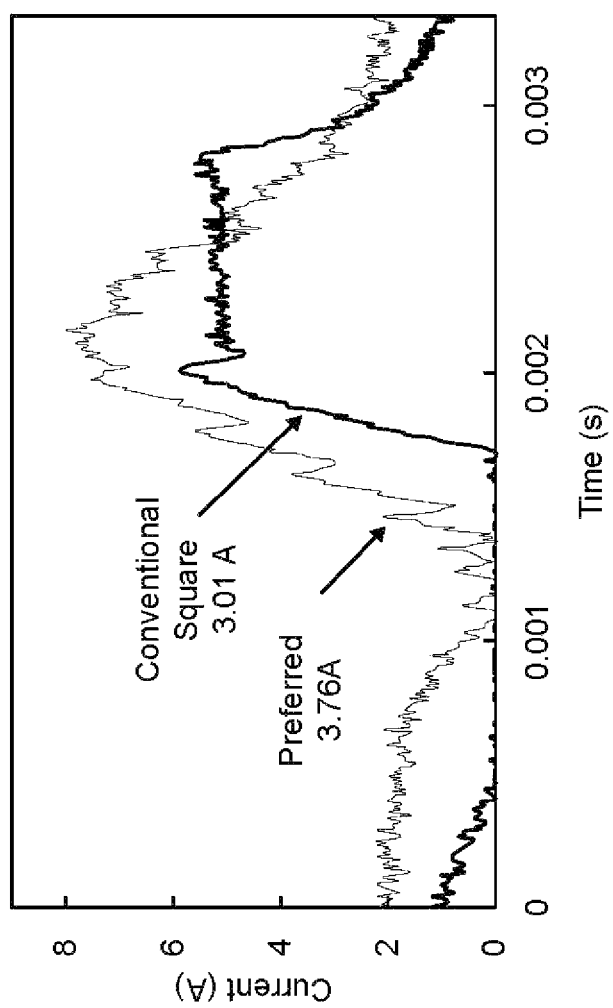
FIG. 15 shows a graphical representation of an example of a comparison between current values measured by the conventional square current and the optimum current generated by the acoustic noise reduction system in accordance with the preferred embodiment of the present invention.

FIG. 15 shows a graphical representation of an example of the measured values of the conventional square current and the optimum current. The conventional square current and the optimum current were excited utilizing hysteresis control. The conventional square current has the RMS value of 3.01 A, while the RMS value of the optimum current is 3.76 A. Both RMS values have a higher RMS value than that of the RMS value of the conventional square current analyzed in the FEA result shown in FIG. 12. There are certain possible factors which would cause this discrepancy. First, there is a discrepancy of the arc of 10 rotor poles in the fabricated machine varying from 0.6° to 3.2° of electrical rotor position. The second reason is that there is a discrepancy of the stator pole arc between the phases varying from 0.6° to 1.3° of electrical rotor position. These two factors directly influence the generated torque and radial force waveforms. Therefore, the adjustment of reference current is necessary to obtain the target torque of 4.8 Nm.

TABLE 1

| Current Excitation | Conventional Square Current | Preferred Optimum Current |
|---|---|---|
| Copper loss, $P_{Cu}$ (W) | 29.98 | 47.12 |
| Core loss, $P_{Core}$ (W) | 86.55 | 85.81 |
| Efficiency, $\eta_e$(%) | 88.59 | 87.19 |

Table I shows a comparison of copper loss, core loss, and efficiency of SRM by the conventional square current and preferred optimum current. The copper loss $P_{Cu}$, is expressed as $$P_{Cu}=i_A^2R+i_B^2R+i_C^2R \quad (21)$$

where $i_A$, $i_B$, and $i_C$ are phase currents at A, B, and C phase, respectively. The coil resistance of one phase coil in 6/10 pole SRM 30 is 1.1Ω.

The efficiency $\eta_e$ of the SRM 30 is expressed as $$\eta_e = \frac{P_{out}}{P_{in}} \quad (22)$$

where $P_{out}$ is the mechanical output power of the SRM 30 and $P_{in}$ is the input power of the SRM 30 by the SRM Inverter. The core loss $P_{Core}$ is expressed as $$P_{Core}=P_{in}-P_{Cu} \quad (23)$$

From Table I, the conventional square current has copper loss and core loss of 29.98 W and 86.55 W, respectively. The preferred optimum current has copper loss and core loss of 47.12 W and 85.81 W, respectively. The optimum current has high copper loss due to high RMS current. The efficiency of the optimum current is 1.4% lower than the single pulse current.

Figure 16:
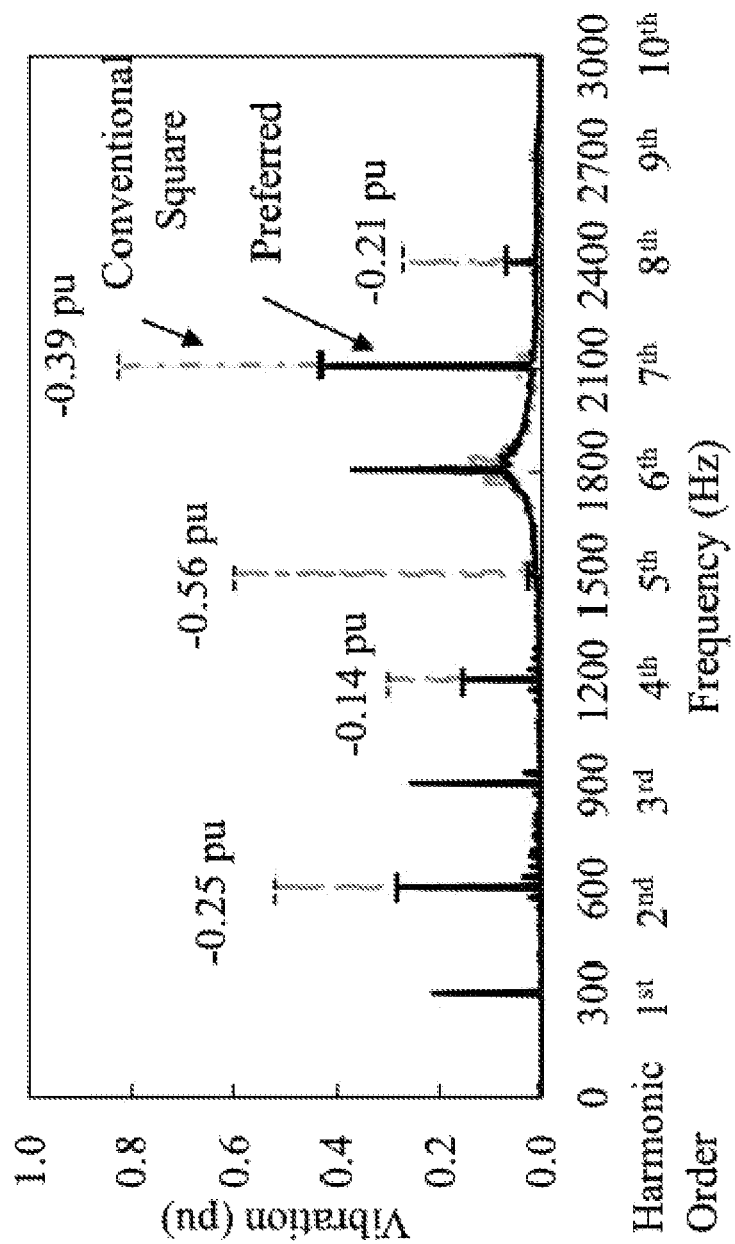
FIG. 16 shows a graphical representation of an example of vibrations measured by the conventional square current and the optimum current generated by the acoustic noise reduction system in accordance with the preferred embodiment of the present invention.

FIG. 16 shows a graphical representation of an example of vibration measurement by the conventional square current and preferred optimum current. As shown in FIG. 16, the dominant vibration occurs at the $2^{nd}$, $4^{th}$, $5^{th}$, $7^{th}$, and $8^{th}$ harmonics of current excitation by the conventional square current for the example embodiment. Compared with the conventional square current, the highest and second highest vibrations of the optimum square current at the $5^{th}$ and $7^{th}$ harmonics or 1200 Hz and 1500 Hz are reduced by −0.56 pu and −0.39 pu. In addition, compared with the conventional square current, vibrations of the optimum square current at $2^{nd}$ and $4^{th}$ or 600 Hz and 1200 Hz are reduced by −0.25 pu and −0.14 pu, respectively. Similarly, the vibration of the optimum waveform at $8^{th}$ harmonic or 2400 Hz is reduced by −0.21 pu.

Figure 17:
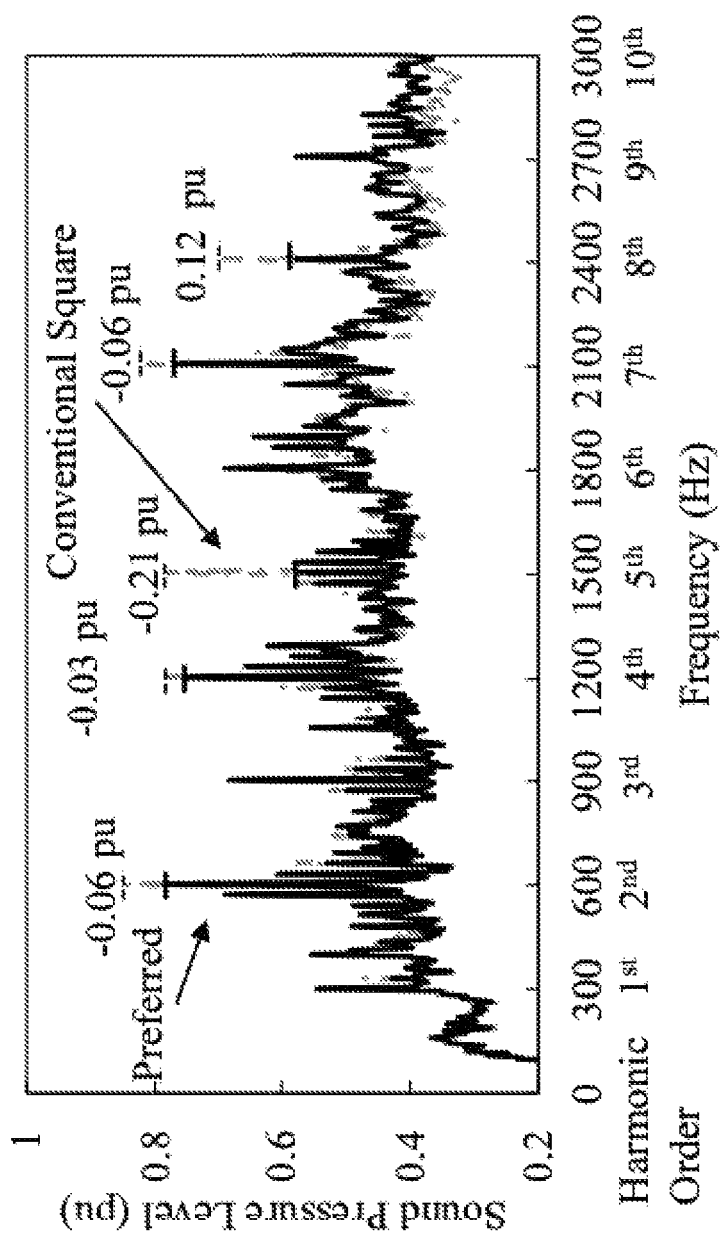
FIG. 17 shows a graphical representation of an example of the acoustic noise measured by the conventional square current and the optimum current generated by the acoustic noise reduction system in accordance with the preferred embodiment of the present invention.

FIG. 17 shows a graphical representation of an example of the acoustic noise measured by the conventional current and preferred optimum current. The reduction of acoustic noises is found at the $2^{nd}$, $4^{th}$, $5^{th}$, $7^{th}$, and $8^{th}$ harmonics of current excitation for the example embodiment. Utilizing the optimum current, the highest peak noise at the $2^{nd}$ harmonic of current frequency or 600 Hz is reduced by −0.06 pu. The maximum reduction of noise by the optimum current is up to −0.21 pu at the $5^{th}$ harmonic or 1500 Hz, which is the third highest peak noise. The peak noises at 1200 Hz, 2100 Hz, and 2400 Hz are also reduced by −0.03 pu, −0.06 pu and −0.12 pu, respectively. From this measurement, it is verified that the reduction of selective radial force harmonics is effective in reducing the acoustic noise and vibration in specific harmonics.

Figure 18:
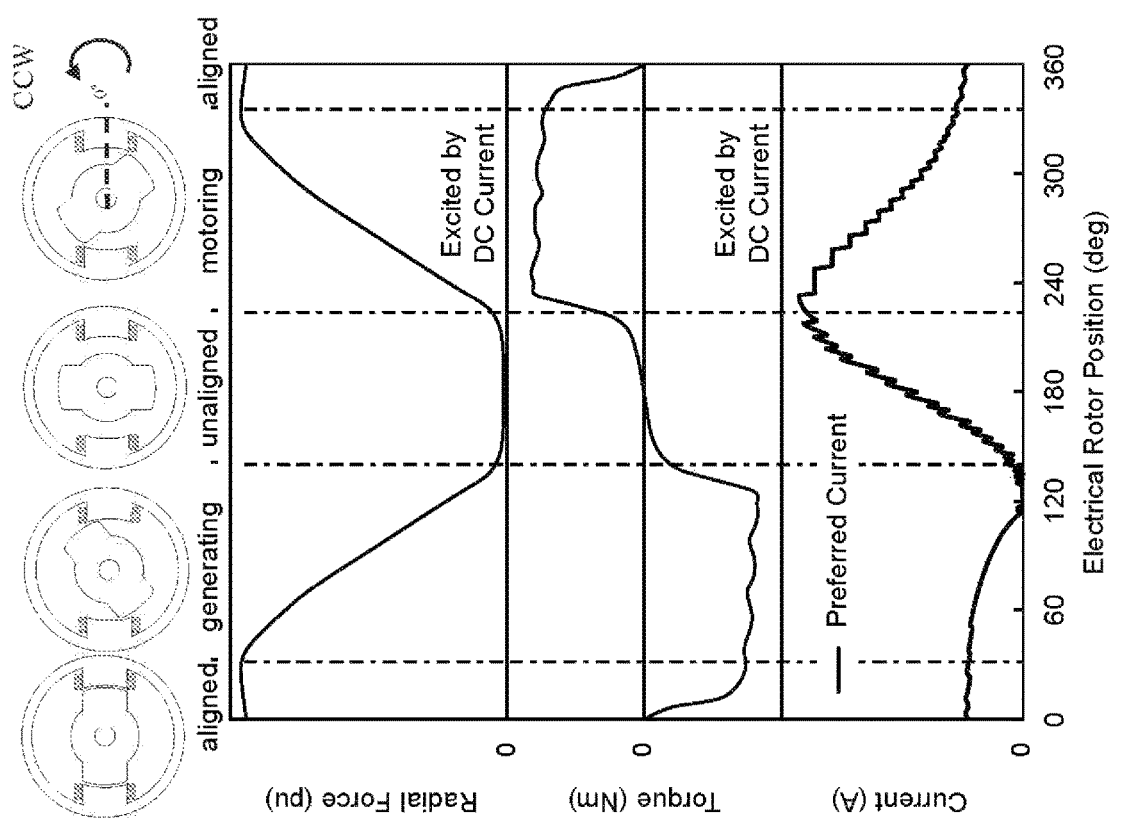
FIG. 18 shows a graphical representation of an example of a comparison between the measured conventional square current and the optimum current generated by the acoustic noise reduction system in accordance with the preferred embodiment of the present invention.

FIG. 18 shows a graphical representation of an example of the radial force and torque waveforms acting at the stator tooth when constant DC current is excited. The radial force has a minimum value at the unaligned position, while it has a maximum value at an aligned position. As for the torque waveform, the maximum torque occurs at the motoring and generating position. Based on this characteristic, the optimum current is derived to reach the target torque and the low radial force in specific harmonics.

As shown in FIG. 18, the peak of reference current is excited at the motoring position to optimally obtain the target torque. In addition, the current is also excited at the aligned and generating positions to generate low radial force harmonics. On the other hand, the current excited at the unaligned position does not give significant contribution to the torque and radial force generation. The radial force is low at an unaligned position due to high reluctance in the air gap. However, the excitation of current is necessary in an unaligned position to compensate the influence of back electromotive force especially in low-speed and high-torque, middle-speed, and high-speed regions. In this case, the current at the unaligned position can be optimized while compensating the influence of back electromotive force.

Figure 19:
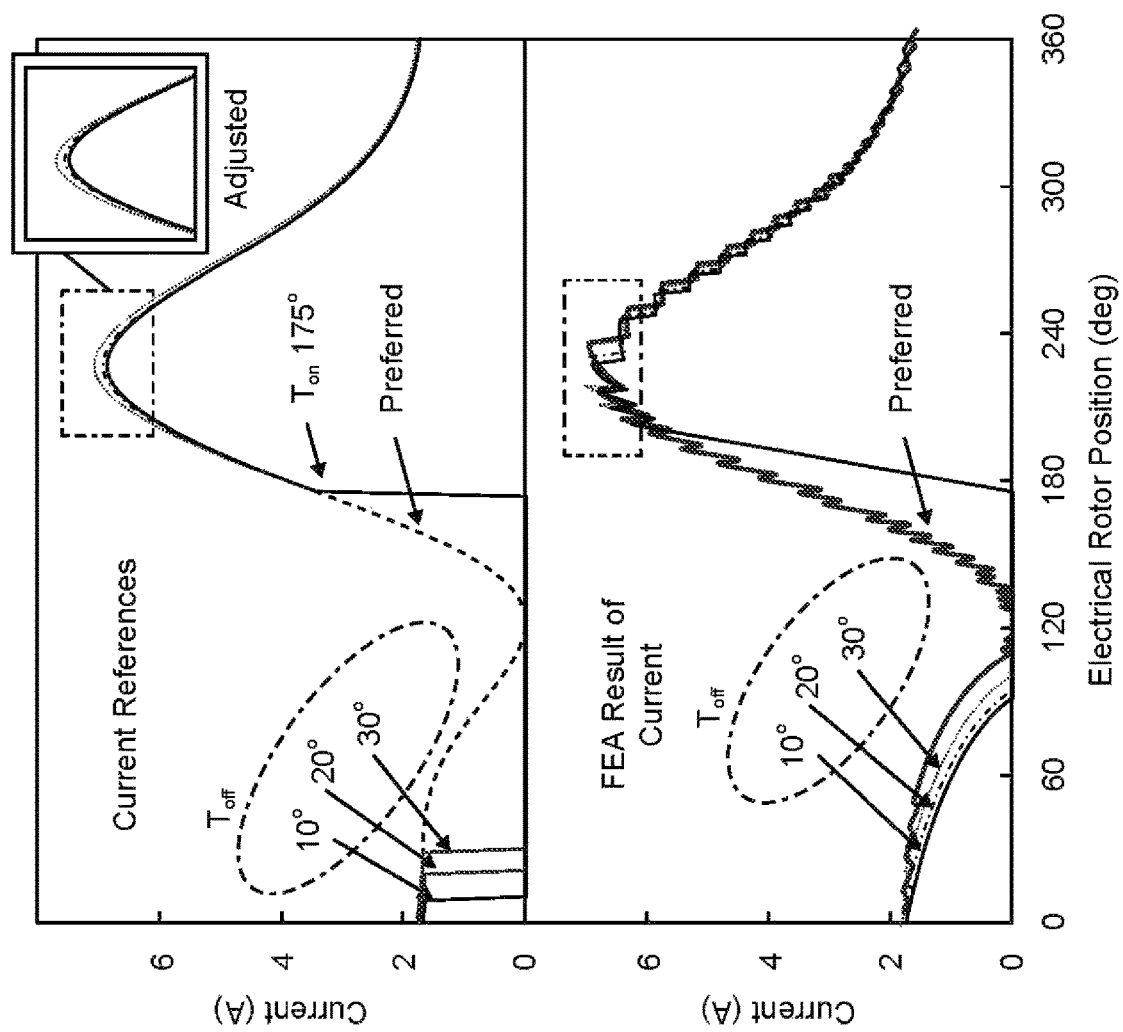
FIG. 19 shows a graphical representation of an example of an improvement of the optimum current for the root mean square (RMS) value reduction in accordance with the preferred embodiment of the present invention.

FIG. 19 shows the improvement of the preferred optimum current for the RMS value reduction. The turn-on angle, typical command in conventional square current is introduced. The turn-on angle is applied in optimum current to optimize the current waveform at unaligned position. In this case, 175° of electrical rotor position is chosen as the optimal angle. For further improvement, the turn-off angle is also applied to the preferred current. By adding turn-off angle in generating position, negative torque will be reduced. The adjustment of peak reference current is necessary to keep the target torque.

TABLE II

| Current Waveforms | RMS (A) | Copper loss $P_{Cu}$ (W) | Core loss $P_{Core}$ (W) | Efficiency $\eta_e$(%) |
| --- | --- | --- | --- | --- |
| Square Waveform | 3.01 | 29.98 | 86.55 | 88.59 |
| Optimum Waveform | 3.76 | 47.12 | 85.81 | 87.19 |

TABLE II-continued

| Current Waveforms | RMS (A) | Copper loss $P_{Cu}$ (W) | Core loss $P_{Core}$ (W) | Efficiency $\eta_e$(%) |
| --- | --- | --- | --- | --- |
| Optimum Waveform with $T_{on}$ | 3.60 | 43.09 | 80.03 | 88.02 |
| Optimum Waveform with $T_{on}$ and $T_{off}$ 30° | 3.52 | 41.19 | 78.63 | 88.31 |
| Optimum Waveform with $T_{on}$ and $T_{off}$ 20° | 3.47 | 40.09 | 76.43 | 88.59 |
| Optimum Waveform with $T_{on}$ and $T_{off}$ 10° | 3.43 | 39.16 | 77.06 | 88.62 |

Table II shows the efficiency comparison of the conventional square current, optimum current, and optimum current with turn-on and various turn-off angles. By adding the turn-on angle, the RMS value of the optimum current is reduced by −4.25%. This improvement increases the efficiency by 0.83%. In addition, the efficiency of the preferred current increases further by adding turn-off angle of 10°, 20°, and 30° of electrical rotor position. The RMS value is reduced to 3.52 A, 3.47 A, and 3.43 A, respectively. Therefore, the efficiency increases to 88.31%, 88.59%, and 88.62% because of the reduction of the copper and core losses.

TABLE III

| | Acoustic Noise Harmonics | | | | |
| --- | --- | --- | --- | --- | --- |
| Current Waveforms | $2^{nd}$ | $4^{th}$ | $5^{th}$ | $7^{th}$ | $8^{th}$ |
| Square Waveform | 84.72 | 77.96 | 78.29 | 82.59 | 69.42 |
| Optimum Waveform | 78.54 | 75.31 | 57.12 | 76.92 | 57.51 |
| Optimum Waveform with $T_{on}$ | 78.35 | 74.76 | 58.00 | 75.84 | 59.32 |
| Optimum Waveform with $T_{on}$ and $T_{off}$ 30° | 78.44 | 72.69 | 67.76 | 76.98 | 64.63 |
| Optimum Waveform with $T_{on}$ and $T_{off}$ 20° | 78.02 | 75.79 | 69.05 | 74.68 | 65.93 |
| Optimum Waveform with $T_{on}$ and $T_{off}$ 30° | 78.78 | 78.06 | 68.65 | 74.24 | 63.62 |

Table III shows the comparison of the measured acoustic noise of the conventional square, optimum, and optimum currents with turn-on and various turn-off angles. By adding the turn-on and turn-off angles, the acoustic noise in the $2^{nd}$ harmonic does not change significantly. It changes within 1 dB with respect to the acoustic noise of the optimum current. In addition, the acoustic noise in the $7^{th}$ harmonic reduces as the turn-on and turn-off angles are carried out. The maximum reduction is up to −2.68 dB by adding a turn-off angle of 10°. However, the acoustic noise in $4^{th}$, $5^{th}$, and $7^{th}$ harmonics tends to increase compared to the optimum current. The maximum increase of the $4^{th}$ harmonic is higher than the conventional square current, which increases by 0.1 dB. While in the $5^{th}$ harmonic, the maximum increase of acoustic noise occurs in optimum current with turn-off angle of 20° is by 0.06 dB. The maximum increase of acoustic noise at the $5^{th}$ harmonic is 69.05 dB, which is still lower than the conventional square current.

From these examples, the addition of turn-on and turn-off angles is effective to reduce the RMS value of the optimum current. However, it also contributes to the increase of the acoustic noise. Although the acoustic noise of the preferred current by turn-on and turn-off angles is increased, it is still within the same amplitude or below the acoustic noise of the conventional square current. The most optimal performance is obtained at the optimum current with the turn-off angle of 20°, which has a competitive RMS value and low acoustic noise in $2^{nd}$, $4^{th}$, $5^{th}$, $7^{th}$ and $8^{th}$ harmonics compared to the conventional square current.

The foregoing description of the preferred embodiment of the present invention has been presented for the purpose of illustration and description. It is not intended to be exhaustive or to limit the invention to the precise form disclosed. Many modifications and variations are possible in light of the above teachings. It is intended that the scope of the present invention not be limited by this detailed description, but by the claims and the equivalents to the claims appended hereto.

We claim:

1. An switched reluctance drive with an acoustic noise reduction system comprising:
a switched reluctance motor (SRM) at least one rotor pole and stator teeth with at least one stator tooth having a stator pole having a winding having a coil resistance, the SRM further comprising a shaft connected to a load and which generates acoustic noise and vibration;
a SRM inverter connected to the SRM; and
a processor on which is installed an acoustic noise reduction application, the processor including:
a reference current generation module to generate a plurality of reference currents, $i_{ref}$, utilizing a Fourier series equation expressed as $$i_{ref} = i_0 + \sum_{n=1}^{n=\infty} i_n \sin(n\theta + \varphi_n)$$

where n=1, 2, ..., $i_0$ and $i_n$ are amplitude of the plurality of reference currents and $\Phi n$ are phase shifts of the plurality of reference currents, and wherein the plurality of reference currents is to approximate a radial force at the at least one stator tooth a maximum current rate calculation module to calculate a maximum rate of change of current $$\frac{di_{max}}{d\theta}$$

by considering the influence of back electromotive force $V_{emf}$ and limited input dc voltage $V_{dc}$ of the switched reluctance drive towards a current waveform, the maximum rate of change of current being expressed as $$\frac{di_{max}}{d\theta} = \frac{V_{dc} - Ri - V_{emf}}{\omega_n L(\theta, i)}$$

where Ri denotes the coil resistance, $\omega_n$ represents shaft rotational angular speed, $\theta$ denotes electrical rotor position and L ($\theta$, i) denotes nonlinear inductance of SRM;
a current profile calculation module to generate at least one current profile $i_{cal}$ ($\theta$) affected by the influence of the back electromotive force $V_{emf}$ and the limited input dc voltage $V_{dc}$;
a torque generation module to determine an average torque of the SRM;
a torque checking module to check whether the average torque satisfies an optimum torque condition;
a radial force calculation module to calculate the radial force at said one stator tooth if the average torque satisfies the optimum torque condition;
a radial force harmonics calculation module to calculate radial force harmonics; and
an optimum current waveform selection module to select the at least one current profile as an optimum current waveform $I_{cal}$ if the at least one current profile generates the average torque, the radial force harmonics acting at the at least one stator tooth being in a proportional relationship with acoustic noise at the specific harmonics of current excitation wherein a reduction in the amplitude of the radial force harmonics utilizes the optimum current waveform minimizes the vibration and acoustic noise in the SRM.

2. The switched reluctance drive with the acoustic noise reduction system of claim 1 wherein the optimum current waveform is applied with turn-on and turn-off angles to improve system efficiency.

3. The switched reluctance drive with the acoustic noise reduction system of claim 1 wherein the optimum current waveform is adaptable to achieve a maximum reduction of the acoustic noise.

4. The switched reluctance drive with the acoustic noise reduction system of claim 1 wherein the optimum torque condition is satisfied when the average torque attains an optimum value.

5. A method for reducing vibration and acoustic noise in a switched reluctance motor (SRM) utilizing an acoustic noise reduction system, the method comprising the steps of:
a. providing the acoustic noise reduction system having the SRM with at least one rotor pole and at least one stator tooth having a stator pole having a winding having a coil resistance, a SRM inverter connected to the SRM and a processor installed with an acoustic noise reduction application, the SRM further comprising a shaft connected to a load and which generates acoustic noise and vibration;
b. generating a plurality of reference currents, $i_{ref}$, utilizing a reference current generation module, at the processor, the reference currents being generated utilizing a Fourier series equation expressed as below, $$i_{ref} = i_0 + \sum_{n=1}^{n=\infty} i_n \sin(n\theta + \varphi_n)$$

where n=1, 2, ..., $i_0$ and $i_n$ are amplitude of the plurality of reference currents and $\Phi n$ are phase shifts of the plurality of reference currents, and wherein the plurality of reference currents is to approximate a radial force at the at least one stator tooth;
c. calculating maximum rate of change of current $$\frac{di_{max}}{d\theta}$$

by considering influence of back electromotive force Vemf and limited input dc voltage Vdc of the switched reluctance drive;
towards a current waveform utilizing a maximum current rate calculation module, at the processor, the maximum rate of change of current being expressed as $$\frac{di_{max}}{d\theta} = \frac{V_{dc} - Ri - V_{emf}}{\omega_n L(\theta, i)}$$

where Ri denotes the coil resistance, $\omega_n$ represents shaft rotational angular speed, $\theta$ denotes electrical rotor position and L($\theta$, i) denotes nonlinear inductance of SRM;

d. generating at least one current profile $i_{cal}(\theta)$ affected by the influence of the back electromotive force $V_{emf}$ and the limited input dc voltage $V_{dc}$ by a current profile calculation module at the processor;

e. calculating an average torque of the SRM utilizing a torque generation module at the processor;

f. enabling a torque checking module, at the processor, to check whether the average torque satisfies an optimum torque condition;

g. calculating the radial force at said stator tooth if the average torque satisfies the optimum torque condition by a radial force calculation module at the processor;

h. calculating radial force harmonics by a radial force harmonics calculation module at the processor;

i. repeating steps b—h for each of parameters $i_0$, $i_n$, and $\varphi_n$; and j. selecting the at least one current profile as an optimum current waveform $I_{cal}$ if the at least one current profile generates the average torque, the radial force harmonics acting at in the at least one stator tooth; being in a proportional relationship with acoustic noise at the specific harmonics of current excitation wherein a reduction in the amplitude of the radial force harmonics utilizes the optimum current waveform minimizes the vibration and acoustic noise in the SRM.

6. The method of claim 5 wherein the efficiency of the switched reluctance drive with acoustic noise reduction system is improved by applying turn-on and turn-off angles in the optimum current waveform.

7. The method of claim 5 wherein an switched reluctance drive with the acoustic noise reduction system further comprises a microphone positioned near the SRM in a radial direction for measuring the acoustic noise generated in the SRM.

8. The method of claim 5 wherein an switched reluctance drive with the acoustic noise reduction system further comprises a vibration sensor positioned on a surface of the SRM to detect and measure vibrations created in the SRM.

9. The method of claim 5 wherein the optimum current waveform is adaptable to achieve a maximum reduction of the acoustic noise.

10. The method of claim 5 wherein the optimum torque condition is satisfied when the average torque attains an optimum value.

11. A method for reducing vibration and acoustic noise in a switched reluctance motor (SRM) utilizing an switched reluctance drive with an acoustic noise reduction system, the method comprising the steps of:

a. providing the acoustic noise reduction system having the SRM with at least one stator having stator teeth, at least one rotor, at least one stator pole on the stator teeth and at least one rotor pole, a SRM inverter connected to the SRM, and a processor installed with an acoustic noise reduction application, wherein the at least one stator pole comprises a winding having a coil resistance, the SRM further comprising a shaft connected to a load and which generates acoustic noise and vibration;

b. generating a plurality of reference currents, $i_{ref}$, utilizing a reference current generation module, at the processor, the reference currents being generated utilizing a Fourier series equation expressed as $$i_{ref} = i_0 + \sum_{n=1}^{n=\infty} i_n \sin(n\theta + \varphi_n)$$

where n=1, 2,. . . , $i_0$ and $i_n$ is the amplitude of the plurality of reference currents and $\Phi n$ are phase shifts of the plurality of reference currents, and wherein the plurality of reference currents is to approximate a radial force at the at least one stator tooth;

c. calculating a maximum rate of change of current $$\frac{di_{max}}{d\theta}$$

by considering towards a current waveform utilizing a maximum current rate calculation module, at the processor, the maximum rate of change of current being expressed as $$\frac{di_{max}}{d\theta} = \frac{V_{dc} - Ri - V_{emf}}{\omega_n L(\theta, i)}$$

where Ri denotes the coil resistance, $\omega n$ represents shaft rotational angular speed, $\theta$ denotes electrical rotor position and L($\theta$, i) denotes nonlinear inductance of SRM;

d. generating at least one current profile $i_{cal}(\theta)$ affected by the influence of the back electromotive force $V_{emf}$ and the limited input dc voltage $V_{dc}$ by a current profile calculation module at the processor;

e. calculating an average torque of the SRM utilizing a torque generation module at the processor;

f. enabling a torque checking module, at the processor, to check whether the average torque satisfies an optimum torque condition;

g. calculating the radial force at one stator tooth if the average torque satisfies the optimum torque condition by a radial force calculation module at the processor;

h. calculating radial force harmonics by a radial force harmonics calculation module at the processor;

i. repeating steps b—h for each of $i_0$, $i_n$, and $\varphi_n$;

j. selecting the at least one current profile as an optimum current waveform $I_{cal}$ if the at least one current profile generating the average torque, the radial force harmonics acting at the at least one startor tooth being in a proportional relationship with acoustic noise at the specific harmonics of current excitation wherein a reduction in the amplitude of the specific radial force harmonics utilizes the optimum current waveform minimizes the vibration and acoustic noise in the SRM; and k. applying turn-on and turn-off angles in the optimum current waveform for improving the efficiency of the acoustic noise reduction system.

12. The method of claim 11 wherein the efficiency of the acoustic noise reduction system is improved with the application of the turn-on and turn-off angles in the optimum current waveform.

13. The method of claim 11 wherein the optimum current waveform is adaptable to achieve a maximum reduction of the acoustic noise.

14. The method of claim 11 wherein the optimum torque condition is satisfied when the average torque attains an optimum value.

15. The acoustic noise harmonic component reduction method of claim 11:
   wherein the acoustic noise harmonics comprise acoustic noise harmonic components, the radial force harmonics comprise radial force harmonics components, and wherein the acoustic noise harmonic component decrease with the corresponding radial force harmonics components; and
   adjusting the current harmonics to decrease the radial force harmonics components.

* * * * *